(12) United States Patent
Suzuki et al.

(10) Patent No.: US 8,889,287 B2
(45) Date of Patent: *Nov. 18, 2014

(54) BIPOLAR BATTERY

(75) Inventors: Naoto Suzuki, Yokosuka (JP); Kenji Hosaka, Yokohama (JP); Takaaki Abe, Yokohama (JP); Yasuhito Miyazaki, Yokohama (JP); Hirotatsu Kamimura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/819,445

(22) PCT Filed: Aug. 4, 2011

(86) PCT No.: PCT/JP2011/067869
§ 371 (c)(1),
(2), (4) Date: Feb. 27, 2013

(87) PCT Pub. No.: WO2012/029497
PCT Pub. Date: Mar. 8, 2012

(65) Prior Publication Data
US 2013/0157092 A1    Jun. 20, 2013

(30) Foreign Application Priority Data

Sep. 1, 2010 (JP) ................. 2010-195792

(51) Int. Cl.
*H01M 2/02* (2006.01)
*H01M 6/46* (2006.01)
(52) U.S. Cl.
USPC ............ 429/179; 429/152; 429/159; 429/178
(58) Field of Classification Search
None
See application file for complete search history.

(56) References Cited

U.S. PATENT DOCUMENTS

| 6,103,416 | A | 8/2000 | Bauerlein et al. |
|---|---|---|---|
| 6,689,176 | B2 | 2/2004 | Jen et al. |
| 6,919,144 | B2 | 7/2005 | Miyazaki et al. |
| 7,179,565 | B2 | 2/2007 | Okochi et al. |
| 7,368,203 | B2 | 5/2008 | Iwanaga et al. |
| 7,851,088 | B2 | 12/2010 | Takahashi et al. |
| 2001/0036573 | A1 | 11/2001 | Jen et al. |

(Continued)

FOREIGN PATENT DOCUMENTS

| EP | 1 418 638 A2 | 5/2004 |
|---|---|---|
| JP | 2000-40530 A | 2/2000 |

(Continued)

OTHER PUBLICATIONS

Taiwanese Search Report dated Dec. 24, 2013, (4 pgs.).

(Continued)

*Primary Examiner* — Cynthia K. Walls
(74) *Attorney, Agent, or Firm* — Foley & Lardner LLP

(57) ABSTRACT

A voltage detection terminal (27a-27e, 27aa-27ee, 27aaa-27eee) and a discharge terminal (21a-21e) are connected to a peripheral edge portion of a collector (4a-4e) of a bipolar battery (2). Assuming a first straight line (Da1) that connects a centroid of the collector (4a-4e) and the voltage detection terminal (27a-27e) and a second straight line (Da2) that is orthogonal to the first straight line (Da1), the discharge terminal (21a-21e) is disposed on an opposite side of the second straight line (Da2)-the voltage detection terminal (27a-27e). A requirement relating to measurement of a voltage of the collector (4a-4e) and a requirement relating to discharge are thereby both satisfied.

8 Claims, 15 Drawing Sheets

(56) References Cited

U.S. PATENT DOCUMENTS

| | | |
|---|---|---|
| 2003/0104279 A1 | 6/2003 | Miyazaki et al. |
| 2004/0038123 A1 | 2/2004 | Hisamitsu et al. |
| 2004/0048158 A1 | 3/2004 | Okochi et al. |
| 2004/0072080 A1 | 4/2004 | Iwanaga et al. |
| 2004/0229123 A1 | 11/2004 | Takahashi et al. |
| 2005/0066520 A1 | 3/2005 | Shu et al. |
| 2005/0141170 A1 | 6/2005 | Honda et al. |
| 2010/0028767 A1 | 2/2010 | Inose et al. |
| 2010/0178553 A1 | 7/2010 | Murata |
| 2011/0014520 A1 | 1/2011 | Ueda |
| 2013/0130082 A1 | 5/2013 | Miyazaki et al. |

FOREIGN PATENT DOCUMENTS

| | | |
|---|---|---|
| JP | 2004-087238 A | 3/2004 |
| JP | 2004-319362 A | 11/2004 |
| JP | 2005-11658 A | 1/2005 |
| JP | 2005-174844 A | 6/2005 |
| JP | 2005-235428 A | 9/2005 |
| JP | 2005-310667 A | 11/2005 |
| JP | 2006-127857 A | 5/2006 |
| JP | 2008-192377 A | 8/2008 |
| JP | 2009-158281 A | 7/2009 |
| JP | 2010-73558 A | 4/2010 |
| JP | 2011-082097 A | 4/2011 |
| RU | 2260867 C1 | 9/2005 |
| RU | 2 298 264 C2 | 4/2007 |
| TW | 492207 B | 6/2002 |
| TW | 499766 B | 8/2002 |
| TW | 506154 | 10/2002 |
| TW | 565961 B | 12/2003 |
| TW | 580777 B | 3/2004 |
| TW | 200512975 A | 4/2005 |
| TW | I239672 B | 9/2005 |
| TW | I286849 B | 9/2007 |
| TW | 201014010 A | 4/2010 |
| WO | WO-01/91209 A1 | 11/2001 |
| WO | WO 03/007415 A1 | 1/2003 |
| WO | WO 2010/010717 A1 | 1/2010 |
| WO | WO-2010/081150 A1 | 7/2010 |

OTHER PUBLICATIONS

Japanese Office Action dated Dec. 24, 2013, (3 pgs.).
Taiwanese Office Action dated Dec. 4, 2013, (4 pgs.).
Russian Decision on Grant and translation dated May 15, 2014, (14 pgs.).
Russian Decision on Grant and English language translation dated Jun. 25, 2014, 14 pgs.
Y. Miyazaki et al., US PTO Notice of Allowance dated Jul. 22, 2014, 10 pgs.

| | |
|---|---|
| 2 BIPOLAR BATTERY | 7 ELECTROLYTE LAYER |
| 3 BIPOLAR ELECTRODE | 11 SEAL MEMBER |
| 4a-4d COLLECTOR | 15 UNIT CELL |
| 5 POSITIVE ELECTRODE ACTIVE MATERIAL LAYER | 20 VOLTAGE BALANCE CIRCUIT |
| 6 NEGATIVE ELECTRODE ACTIVE MATERIAL LAYER | 21a-21e DISCHARGE TERMINAL |

| | |
|---|---|
| 22a-22e | DISCHARGE WIRE |
| 24a-24e | RESISTOR |
| 25a-25e | SWITCH |
| 27a-27e | VOLTAGE DETECTION TERMINAL |
| 28a-28e | VOLTAGE DETECTION WIRE |

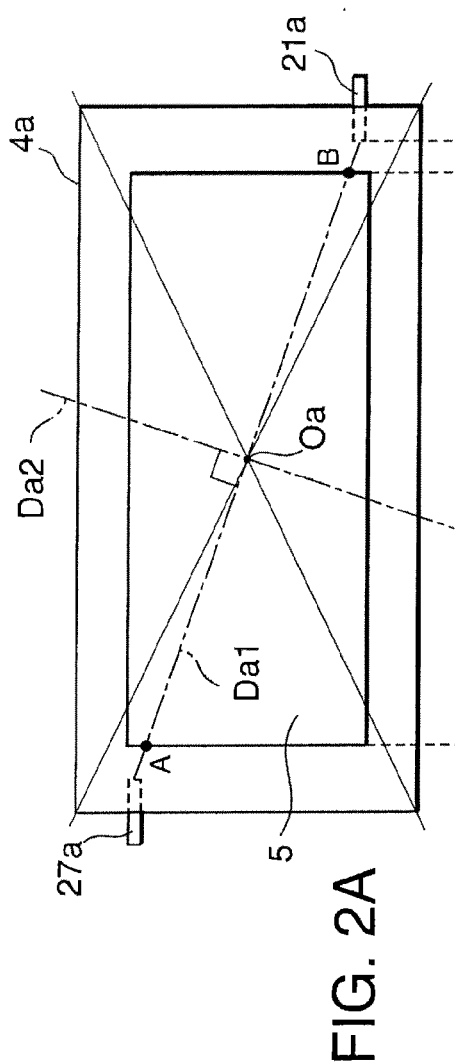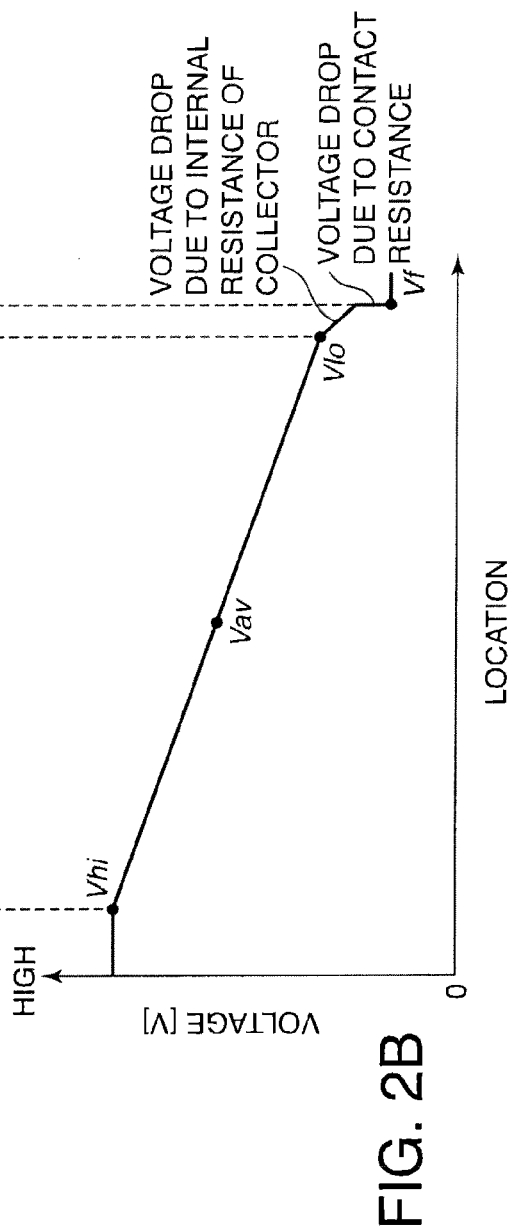
FIG. 2A
FIG. 2B

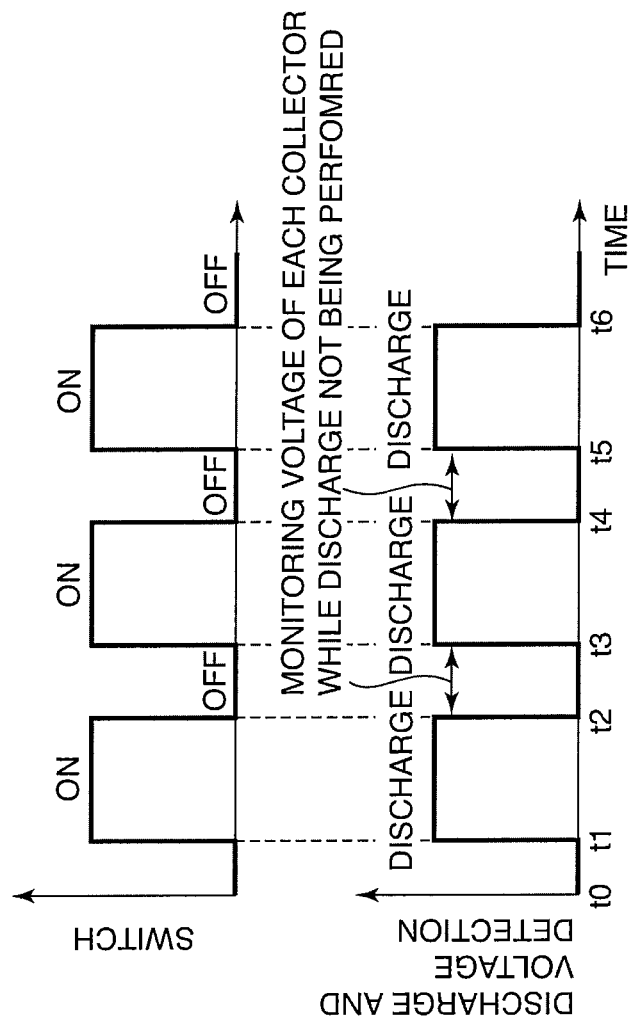

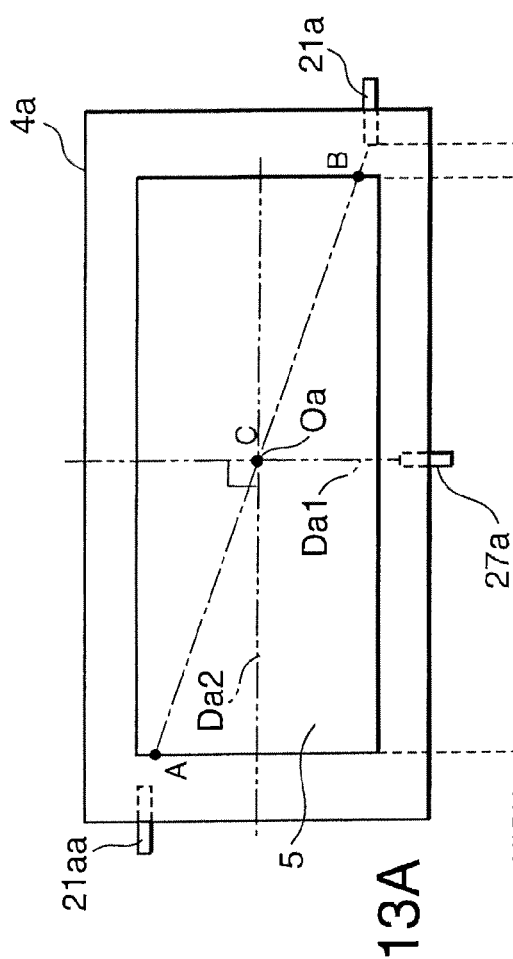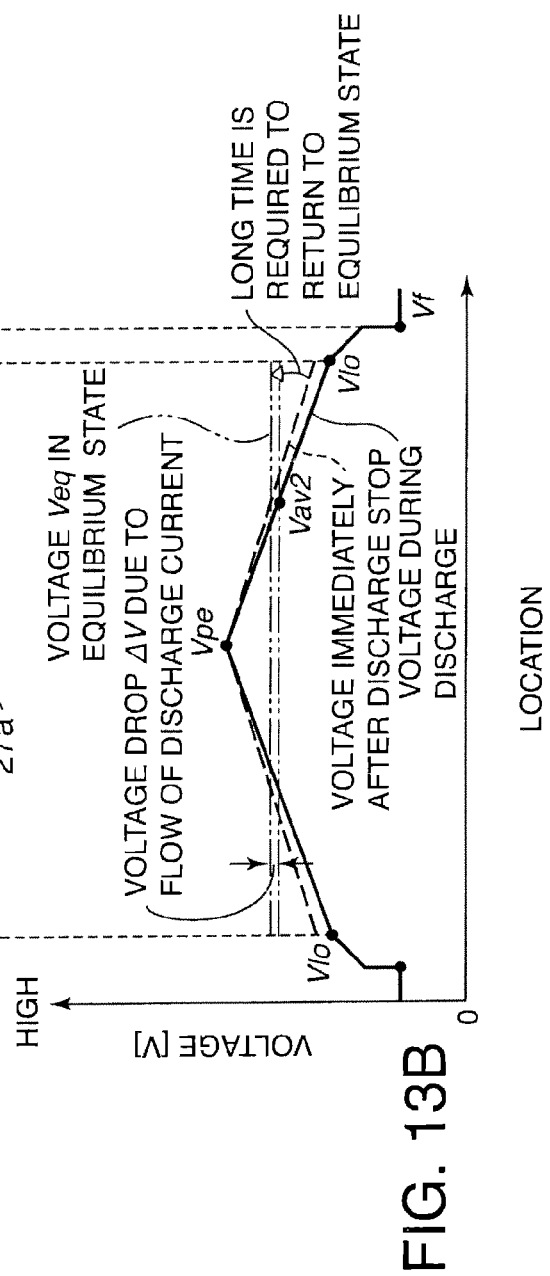
FIG. 13A
FIG. 13B

BIPOLAR BATTERY

FIELD OF THE INVENTION

This invention relates to an arrangement of a voltage detection terminal and a discharge terminal attached to a collector of a bipolar battery.

BACKGROUND OF THE INVENTION

A bipolar battery is typically constructed by laminating a plurality of bipolar electrodes with a plurality of electrolyte layers through which ions move internally. The bipolar electrode comprises a layer-form collector, a positive electrode active material layer disposed on one surface of the collector, and a negative electrode active material layer disposed on another surface of the collector. The lamination is performed such that the positive electrode active material layer and the negative electrode active material layer oppose each other via the electrolyte layer.

In a laminated condition, the positive electrode active material layer and the negative electrode active material layer opposing each other via the electrolyte layer constitute a unit cell. In the bipolar battery, therefore, a plurality of unit cells are connected in series.

The unit cells vary in internal resistance, capacity, and so on due to factors arising during a manufacturing process. When variation exists among voltages apportioned to the unit cells, deterioration advances from a unit cell having a large voltage, and as a result, a lifespan of the entire bipolar battery shortens.

To extend the lifespan of the entire bipolar battery, therefore, the voltage of each unit cell is preferably measured, whereupon the voltage of each unit cell is adjusted on the basis of the measured voltage.

JP 2005-235428, published by the Japan Patent Office in 2005, teaches that in order to measure the voltage of each unit cell of a bipolar battery, a voltage detection terminal is to be attached to the collector of each unit cell so that a voltage can be extracted from each unit cell for measurement.

SUMMARY OF THE INVENTION

To adjust the voltage of each unit cell on the basis of the measured voltage, each collector must perform discharge individually. This discharge control is known as voltage balance control.

Different characteristics are required of a discharge terminal and a voltage detection terminal. The discharge terminal is preferably provided in a position where a large amount of discharge current can be caused to flow. As regards voltage measurement, on the other hand, the voltage varies dramatically in a site where a large amount of discharge current flows, and therefore, in consideration of the measurement precision, the voltage is preferably not measured in this site. Hence, when discharge is performed using a voltage detection terminal, the precision of the voltage balance control decreases.

It is therefore an object of this invention to satisfy both a requirement relating to measurement of a voltage of a collector and a requirement relating to discharge from the collector.

In order to achieve the above object, this invention provides a bipolar battery in which a plurality of bipolar electrodes, each comprising a layer-form collector, a positive electrode active material layer disposed on one surface of the collector, and a negative electrode active material layer disposed on another surface of the collector, and a plurality of electrolyte layers through which ions move internally are laminated in a state where the positive electrode active material layer and the negative electrode active material layer oppose each other via the electrolyte layer.

The collector comprises a voltage detection terminal and a discharge terminal connected to a peripheral edge portion thereof. The voltage detection terminal and the discharge terminal are disposed as follows. Assuming a first straight line that connects a centroid of the collector and the voltage detection terminal and a second straight line that is orthogonal to the first straight line, the discharge terminal is disposed on an opposite side of the second straight line to the voltage detection terminal.

The details as well as other features and advantages of this invention are set forth in the remainder of the specification and are shown in the accompanying drawings. It should be noted that thicknesses and shapes of respective layers constituting the bipolar battery may be exaggerated in the attached drawings in order to facilitate description.

BRIEF DESCRIPTION OF THE DRAWINGS

FIGS. 2A and 2B are a schematic plan view of a collector and a positive electrode active material layer of the bipolar battery and a diagram showing voltage variation in an interior of the collector during discharge;

FIGS. 9A and 9B are timing charts illustrating discharge control according to the comparative example #2;

FIGS. 13A and 13B are a schematic plan view of a collector and a positive electrode active material layer of the bipolar battery according to the third embodiment of this invention, and a diagram showing voltage variation in the interior of the collector according to the third embodiment of this invention during discharge;

DESCRIPTION OF THE PREFERRED EMBODIMENTS

Figure 1:
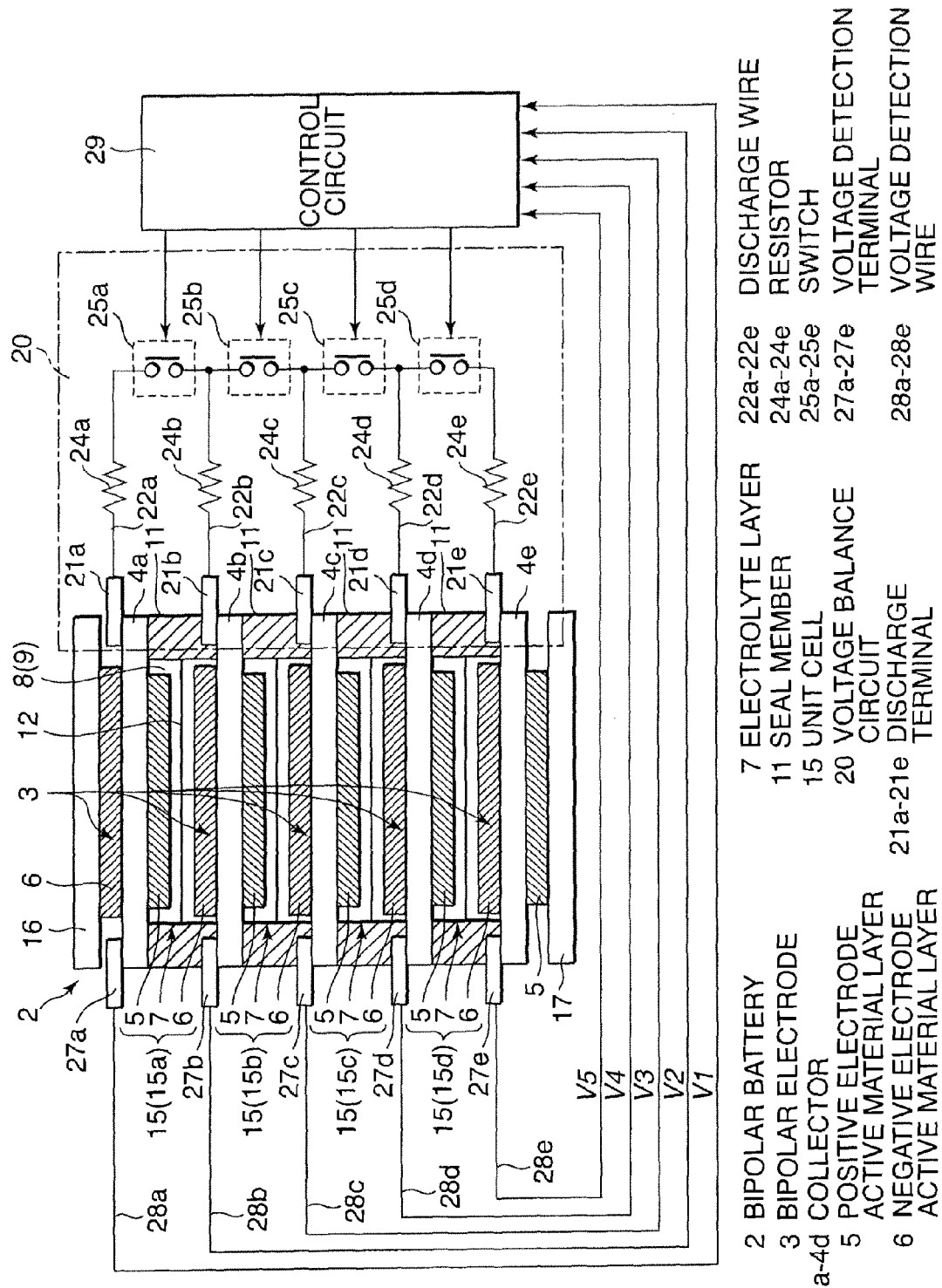
FIG. 1 is a diagram showing a voltage balance control circuit of a bipolar battery according to a first embodiment of this invention.

Referring to FIG. 1 of the drawings, a bipolar battery 2 according to a first embodiment of this invention includes five layer-form collectors 4a to 4e laminated via separators 12. A positive electrode active material layer 5 is formed on one surface of each collector 4a to 4e, and a negative electrode active material layer 6 is formed on another surface. The collector 4a to 4e, the positive electrode active material layer 5, and the negative electrode active material layer 6 together constitute a bipolar electrode 3. Therefore, the bipolar battery 2 includes five bipolar electrodes 3.

The negative electrode active material layer 6 is set to have a larger surface area than the positive electrode active material layer 5. The bipolar electrodes 3 are laminated in a vertical direction via electrolyte layers 7.

Here, two bipolar electrodes 3 adjacent to each other in the vertical direction in the figure will be referred to for descriptive purposes as an upper stage bipolar electrode and a lower stage bipolar electrode. The upper stage bipolar electrode and the lower stage bipolar electrode are disposed in a state where the negative electrode active material layer 6 positioned on an upper surface of the lower stage bipolar electrode and the positive electrode active material layer 5 positioned on a lower surface of the upper stage bipolar electrode oppose each other via the electrolyte layer 7.

Referring to FIG. 2A, the respective surface areas of the positive electrode active material layer 5 and the negative electrode active material layer 6 are set to be smaller than a horizontal direction surface area of the collector 4a to 4e. In other words, the positive electrode active material layer 5 and the negative electrode active material layer 6 are not provided in a peripheral edge region of the collector 4a to 4e when seen from a lamination direction.

Referring again to FIG. 1, a seal member 11 having a predetermined width is sandwiched between the peripheral edge regions of two collectors 4a to 4e adjacent to each other in the lamination direction. The seal member 11 insulates the positive electrode active material layer 5 and the negative electrode active material layer 6 from each other and secures a predetermined space 8 between the positive electrode active material layer 5 and the negative electrode active material layer 6 opposing each other in the vertical direction of the figure. The seal member 11 is disposed on an outer side of an outer periphery of the positive electrode active material layer 5 and the negative electrode active material layer 6.

A liquid-form or gel-form electrolyte 9 is charged into the space 8. Further, the separator 12, which is formed from a porous membrane through which the electrolyte 9 can pass, is provided across the space 8 substantially parallel to the positive electrode active material layer 5 and the negative electrode active material layer 6. The separator 12 serves to prevent electric contact between the two opposing electrode active material layers 5 and 6. The electrolyte layer 7 is constituted by the electrolyte 9 charged into the space 8 and the separator 12.

A high current tab 16 and a high current tab 17 are connected respectively to the negative electrode active material layer 6 on an uppermost stage and the positive electrode active material layer 5 on a lowermost stage. In the charged bipolar battery 2, the high current tab 16 functions as a positive terminal and the high current tab 17 functions as a negative terminal.

A single unit cell 15a to 15d is constituted by the electrolyte layer 7. The positive electrode active material layer 5 is disposed on an upper side of the electrolyte layer 7 and the negative electrode active material layer 6 is disposed on a lower side of the electrolyte layer 7. Hence, the bipolar battery 2 is constituted by the four unit cells 15a to 15d connected in series. It should be noted that a number of unit cells and a number of bipolar batteries 2 connected in series may be adjusted in accordance with a desired voltage.

A single bipolar battery module is constructed by laminating four bipolar batteries 2 and housing the laminated bipolar batteries 2 in a metal box. Furthermore, a bipolar battery assembly is constructed from a plurality of modules.

Referring again to FIG. 2A, the collector 4a to 4e takes a rectangular shape having a short side and a long side. The collector 4a to 4e is constituted by a conductive polymer material or a resin formed by adding a conductive filler to a nonconductive polymer material. The collector 4a to 4e is not limited to resin and may be formed from a metal.

A material in which a resistivity in a current flow direction is relatively large, i.e. no less than 0.01 ohm centimeters ($\Omega \cdot cm$), and in which a non-constant voltage distribution occurs in sites contacting the positive electrode active material layer 5 and the negative electrode active material layer 6 during discharge of the unit cell 15a to 15e, is preferably employed as a material of the collector 4a to 4e. An alloy containing nichrome and stainless steel may be cited as metals exhibiting relatively large resistance in the current flow direction.

An electric circuit for performing voltage balance control is connected to the bipolar battery 2. Here, voltage balance control is control for making respective voltages of the four unit cells 15a to 15d even by performing individual discharge from the collectors 4a to 4e.

A discharge terminal 21a and a voltage detection terminal 27a are attached to a peripheral edge portion of the collector 4a. A discharge terminal 21b and a voltage detection terminal 27b are attached to a peripheral edge portion of the collector 4b. A discharge terminal 21c and a voltage detection terminal 27c are attached to a peripheral edge portion of the collector 4c. A discharge terminal 21d and a voltage detection terminal 27d are attached to a peripheral edge portion of the collector 4d. A discharge terminal 21e and a voltage detection terminal 27e are attached to a peripheral edge portion of the collector 4e.

FIG. 1 is a schematic longitudinal sectional view of the bipolar battery 2, in which an upper side of the figure corresponds to a vertical upper side and a lower side corresponds to a vertical lower side.

The bipolar battery 2 is covered by an outer covering material made of a compound laminate film constituted by a resin and a metal. A peripheral edge portion of the outer covering material is joined by heat sealing such that the bipolar battery 2 is sealed in a vacuum condition. The high current tabs 16 and 17, the discharge terminals 21a to 21e, and the voltage detection terminals 27a to 27e project to an outer side of the outer covering material.

When voltages apportioned to the four unit cells 15a to 15d connected in series are not identical, it is impossible to obtain a desired battery voltage from the bipolar battery 2 as a whole. In the bipolar battery 2, balance currents discharged from the respective collectors 4a to 4e are controlled such that the respective voltages of the four unit cells 15a to 15d match. Here, the balance current is a current discharged to make the voltages of the four unit cells 15a to 15d even. Balance current control will also be referred to as "voltage balance control". Voltage balance control is control for making the voltages of the four unit cells 15a to 15d even through discharge. Hereafter, the terms balance current and voltage balance control will be used with the definitions described above.

When the voltage detection terminal doubles as the discharge terminal through which the balance current flows in a case where a resin or a metal having a relatively large resistance in a flow direction of the balance current is used as the collector, the voltage is detected in a site where the balance current flows in a largest amount during discharge. To detect the voltage with stability, however, detection is preferably performed in a site where the balance current flows in a relatively small amount. When the voltage is detected in a site where the balance current flows in a large amount, the voltage is likely to vary greatly. When the detected voltage varies, the balance current control for aligning the voltages of the unit cells 15a to 15d becomes difficult.

In the bipolar battery 2 according to this embodiment, the voltage detection terminals 27a to 27e for detecting the voltages of the unit cells 15a to 15d and the discharge terminals 21a to 21e for performing discharge from the unit cells 15a to 15d are provided in separate peripheral edge portions of the collectors 4a to 4e on surfaces of the respective collectors 4a to 4e.

Referring again to FIG. 2A, the collectors will be described more specifically, using the collector 4a as an example. The positive electrode active material layer 5 is formed on one surface of the collector 4a by leaving a heat seal portion having a predetermined width on the peripheral edge portion. The figure corresponds to a plan view showing the collector 4a from the lower side of FIG. 1. It should be noted that the discharge terminal 21a and the voltage detection terminal 27a are connected to the surface on which the negative electrode active material layer 6 is formed. Voltages of these terminals are expressed by negative values.

First, a first straight line Da1 linking the voltage detection terminal 27a to a centroid Oa of the collector 4a is drawn on a plane of the collector 4a. The discharge terminal 21a is then disposed on an opposite side of a second straight line Da2, which is orthogonal to the first straight line Da1 at the centroid Oa, to the voltage detection terminal 27a. Disposing the voltage detection terminal 27a and the discharge terminal 21a on either side of the second straight line Da2 in this manner is a requirement of the bipolar battery 2 according to this invention.

When a planar form of the collector 4a is divided into four regions by two diagonal lines of the rectangular collector 4a, the voltage detection terminal 27a and the discharge terminal 21a are preferably disposed in one and another of two non-adjacent regions. More preferably, these regions are regions in which an intersection angle of the diagonal lines is an acute angle. More specifically, the voltage detection terminal 27a is disposed on one short side of the rectangular collector 4a, and the discharge terminal 21a is disposed on the other short side. Even more preferably, the voltage detection terminal 27a and the discharge terminal 21a are disposed at an angular interval of no less than 150 degrees and less than 210 degrees.

The voltage detection terminals 27b to 27e and the discharge terminals 21b to 21e are disposed similarly on the collectors 4b to 4e.

Referring again to FIG. 1, a voltage balance circuit 20 includes five discharge wires 22a to 22e, five fixed resistors 24a to 24e, and four switches 25a to 25d, which are connected to the five discharge terminals 21a to 21e.

To perform discharge from each of the four unit cells 15a to 15d, the discharge terminals 21a to 21e are connected to the peripheral edge portions of the five collectors 4a to 4e in predetermined locations satisfying the conditions described above by a method such as adhesion. As described above, the discharge terminals 21a to 21e are drawn to the outer side of the resin/metal compound laminate film. One end of the five discharge wires 22a to 22e of the voltage balance circuit 20 is connected to each of the five discharge terminals 21a to 21e.

In other words, one end of the discharge wire 22a is connected to the discharge terminal 21a. One end of the discharge wire 22b is connected to the discharge terminal 21b. One end of the discharge wire 22c is connected to the discharge terminal 21c. One end of the discharge wire 22d is connected to the discharge terminal 21d. One end of the discharge wire 22e is connected to the discharge terminal 21e.

Another end of the discharge wire 22a and another end of the discharge wire 22b are connected to the switch 25a. The other end of the discharge wire 22b and another end of the discharge wire 22c are connected to the switch 25b. The other end of the discharge wire 22c and another end of the discharge wire 22d are connected to the switch 25c. The other end of the discharge wire 22d and another end of the discharge wire 22e are connected to the switch 25d.

The four switches 25a to 25d are normally open switches. ON/OFF operations of the switches 25a to 25d are controlled by a control circuit 29.

The voltage detection terminals 27a to 27e provided on the five collectors 4a to 4e are connected to the control circuit 29 via respective voltage detection wires 28a to 28e.

Components used in the voltage balance circuit 20 for the four unit cells 15a to 15d are assumed to have identical specifications. More specifically, the discharge terminals 21a to 21e are created to identical specifications. The switches 25a to 25d also have identical specifications. The discharge wires 22a to 22e are all constructed using identical materials and at identical lengths. The five fixed resistors 24a to 24e all have identical resistance values. The voltage detection terminals 27a to 27e also have identical specifications. The voltage detection wires 28a to 28e also have identical specifications.

Referring again to FIG. 2A, the positive electrode active material layer 5 is formed on one surface of the collector 4a by leaving a heat seal portion having a predetermined width on the peripheral edge portion. The figure corresponds to a plan view showing the collector 4a from below. It should be noted that the discharge terminal 21a and the voltage detection terminal 27a are connected to the surface on which the negative electrode active material layer 6 is formed. Voltages of these terminals are expressed by negative values. Since negative values are difficult to handle, however, variation in the voltages of respective parts will be described below taking as an example a case in which the discharge terminal 21a and the voltage detection terminal 27a are connected to the surface on which the positive electrode active material layer 5 is formed.

When the collector 4a is seen from below, the discharge terminal 21a is disposed in the vicinity of a lower right corner portion of the figure and the voltage detection terminal 27a is disposed in the vicinity of an upper left corner portion of the figure. During discharge from the unit cell 15a, a discharge current flows toward the discharge terminal 21a from an entire region of the positive electrode active material layer 5. Therefore, the discharge current flows in a steadily larger amount toward a region in the vicinity of the discharge terminal 21a. When the discharge current flows in a large amount, the voltage decreases greatly. Hence, the voltage cannot be detected with a high degree of precision in a site where the discharge current flows in a large amount. Conversely, the voltage decreases by a steadily smaller amount as the discharge current flow decreases. The voltage can be detected with a high degree of precision in a site where the discharge current flow is small, and therefore the voltage detection terminal 27a is connected to the peripheral edge portion of the collector 4a in a position where the discharge current flows in the smallest amount, i.e. the vicinity of the upper left corner portion of the figure, which is a site furthest removed from the discharge terminal 21a.

FIG. 2B shows variation in the voltage of the collector 4a along a dot-dash line linking the voltage detection terminal 27a and the discharge terminal 21a in FIG. 2A during discharge of the unit cell 15a from the discharge terminal 21a. A voltage at a point A positioned on a left side edge of the positive electrode active material layer 5 in the figure is set as a high side voltage Vhi, while a voltage at a point B positioned on a right side edge of the positive electrode active material layer 5 in the figure is set as a low side voltage Vlo. The internal voltage of the collector 4a decreases from the high side voltage Vhi to the low side voltage Vlo while advancing from the point A to the point B. In the figure, voltage variation from the point A to the point B is approximated by a straight line.

The positive electrode active material layer 5 is not provided to the right side of the point B in the figure, and therefore the discharge current flows only through the collector 4a. The collector 4a has greater internal resistance than a metal conductor, and therefore a voltage reduction corresponding to this internal resistance occurs. Further, contact resistance exists between the collector 4a and the discharge terminal 21a, and therefore a voltage reduction corresponding to this contact resistance occurs. In other words, the voltage decreases greatly in the vicinity of the point B. As a result, a voltage Vf of the first discharge terminal 21a decreases to a voltage obtained by subtracting these two voltage reductions from the low side voltage Vlo at the point B.

Between the point A and a right end of the voltage detection terminal 27a, meanwhile, the positive electrode active material layer 5 does not exist and substantially no discharge current flows, and therefore a voltage reduction does not occur. Hence, the voltage of the voltage detection terminal 27a is substantially equal to the high side voltage Vhi at the point A.

A case in which the discharge terminal 21a and the voltage detection terminal 27a are connected to the surface on which the positive electrode active material layer 5 is formed was described above.

In light of the above description, a case in which the discharge terminal 21a and the voltage detection terminal 27a are connected to the surface on which the negative electrode active material layer 6 is formed, as shown in FIG. 1, will now be described.

In this case, a voltage on an ordinate in FIG. 2B may be considered to have a negative value. In other words, a negative voltage value increases toward the "HIGH" mark on the ordinate. The current flows from the discharge terminal 21a toward the voltage detection terminal 27a. Here, the voltage is reduced from a voltage Va of the discharge terminal 21a to a negative voltage Vlo at the point B by the voltage reduction caused by the contact resistance between the discharge terminal 21a and the collector 4a and the voltage reduction caused by the internal resistance of the collector 4a. The current flows mainly through the negative electrode active material layer 6 between the point B and the point A, and during this time, the voltage decreases substantially linearly. Between the point A and the voltage detection terminal 27a, the negative electrode active material layer 6 does not exist and substantially no current flows, and therefore a voltage reduction does not occur. Hence, the voltage of the voltage detection terminal 27a is substantially equal to the voltage Vhi at the point A. It should be noted, however, that the voltage Vhi is a negative voltage.

An average value Vav (=(Vhi+Vlo)/2) of the high side voltage Vhi and the low side voltage Vlo may be employed as the voltage of the collector 4a. It should be noted, however, that the voltage balance circuit 20 according to this embodiment does not detect the low side voltage Vlo in relation to any of the collectors 4a to 4e. Only the high side voltage Vhi, which appears to be larger than the average value Vav, is detected in each of the collectors 4a to 4e as voltages V1 to V5 shown in FIG. 1.

When a high degree of detection precision is not required in relation to the voltages of the collectors 4a to 4e during discharge, discharge control may be performed using the voltages V1 to V5 as representative voltage values of the collectors 4a to 4e. When a high degree of detection precision is required, a relationship between the high side voltage Vh1 (V1) of the collector 4a, the high side voltage Vh1 (V2) of the discharge destination collector 4b, and the average voltage value Vav of the collector 4a is preferably stored on a map in advance such that the average value Vav can be determined from the voltages V1 and V2 by referring to the map. The map is created by matching. This applies likewise to the voltages of the collectors 4b to 4e.

Referring again to FIG. 1, the detected voltages V1 to V5 of the voltage detection terminals 27a to 27e are input into the control circuit 29 via the voltage detection wires 28a to 28e. The control circuit 29 is constituted by a microcomputer comprising a central processing unit (CPU), a read-only memory (ROM), a random access memory (RAM), and an input/output interface (I/O interface). The control circuit 29 may be constituted by a plurality of microcomputers.

The control circuit 29 calculates voltages ΔV1 to Δ4 of the four unit cells 15a to 15d on the basis of the five detected voltages V1 to V5.

The control circuit 29 then open/close controls the four switches 25a to 25d such that the voltages ΔV1 to ΔV4 of the four unit cells 15a to 15d all have identical values. As a result, the balance current is discharged from the unit cell 15a to 15d having a high voltage to the corresponding fixed resistor 24a to 24e. More specifically, the voltage of the unit cell having the lowest voltage of the four unit cells 15a to 15d is set as a target voltage, and the voltages of all of the unit cells 15a to 15d are aligned with the target voltage by discharging the remaining unit cells to reduce the voltages thereof to the target voltage.

It is assumed, for example, that the voltage ΔV3 of the unit cell 15c is lower than the voltages ΔV1, ΔV2, ΔV4 of the remaining three unit cells 15a, 15b, 15d. In this case, the voltage ΔV3 of the third unit cell 15c is set as a target voltage ΔVm. Discharge is then performed from the remaining three unit cells 15a, 15b, 15d until the voltages ΔV1, ΔV2, ΔV4 of the remaining three unit cells 15a, 15b, 15d match the target voltage ΔVm.

Figure 3:
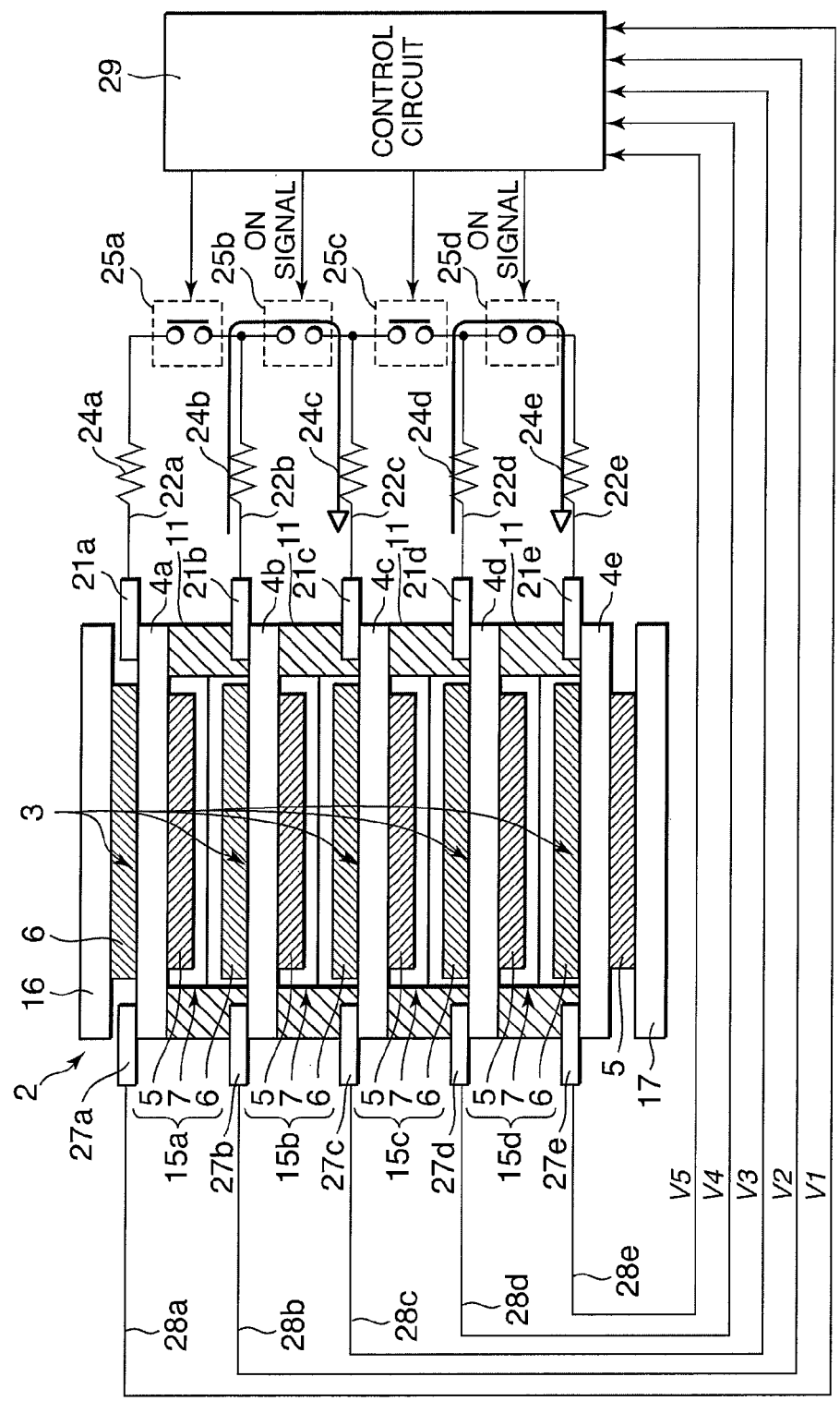
FIG. 3 is a voltage balance control circuit diagram illustrating a current flow through the bipolar battery at a first stage of voltage balance control according to the first embodiment of this invention.

Referring to FIG. 3, the control circuit 29 switches the second switch 25b and the fourth switch 25d ON for a predetermined period as a first stage. Accordingly, the balance current flows to the fixed resistors 24b to 24e in a direction indicated by an arrow in the figure. As a result, the voltage V2 of the unit cell 15b and the voltage V4 of the unit cell 15d decrease. Following the elapse of the predetermined period, the control circuit 29 switches the second switch 25b and the fourth switch 25d OFF again.

Figure 4:
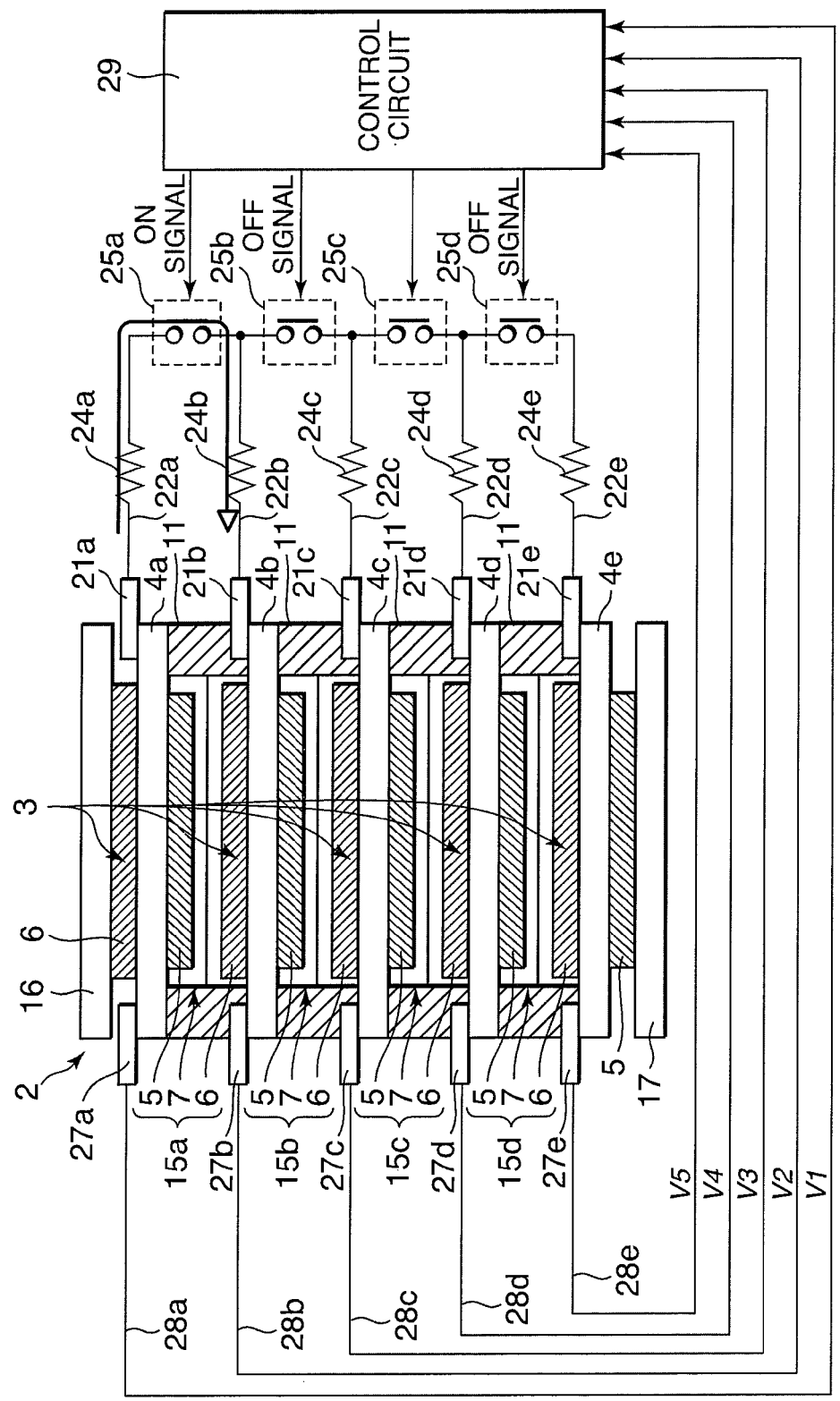
FIG. 4 is a voltage balance control circuit diagram illustrating the current flow through the bipolar battery at a second stage of the voltage balance control according to the first embodiment of this invention.

Referring to FIG. 4, the control circuit 29 switches the first switch 25a ON for a predetermined period as a second stage. Accordingly, the balance current flows to the fixed resistors 24a and 24b in a direction shown in the figure. As a result, the voltage V1 of the unit cell 15a decreases. Following the elapse of the predetermined period, the control circuit 29 switches the first switch 25a OFF again.

By executing processing in two stages in this manner, the voltages ΔV1, ΔV2, ΔV4 of the remaining three unit cells 15a, 15b, 15d are respectively reduced until finally becoming equal to the target voltage ΔVm.

A case in which the discharge terminal 21a and the voltage detection terminal 27a are connected to the surface of the collector 4a to 4e on which the positive electrode active material layer 5 is formed was described above. The control circuit 29 controls the switches 25a to 25d in an identical fashion likewise when the discharge terminal 21a and the voltage detection terminal 27a are connected to the surface of the collector 4a to 4e on which the negative electrode active material layer 6 is formed, but in this case, the current flow is reversed from that shown by the arrows in FIGS. 3 and 4.

Figure 5:
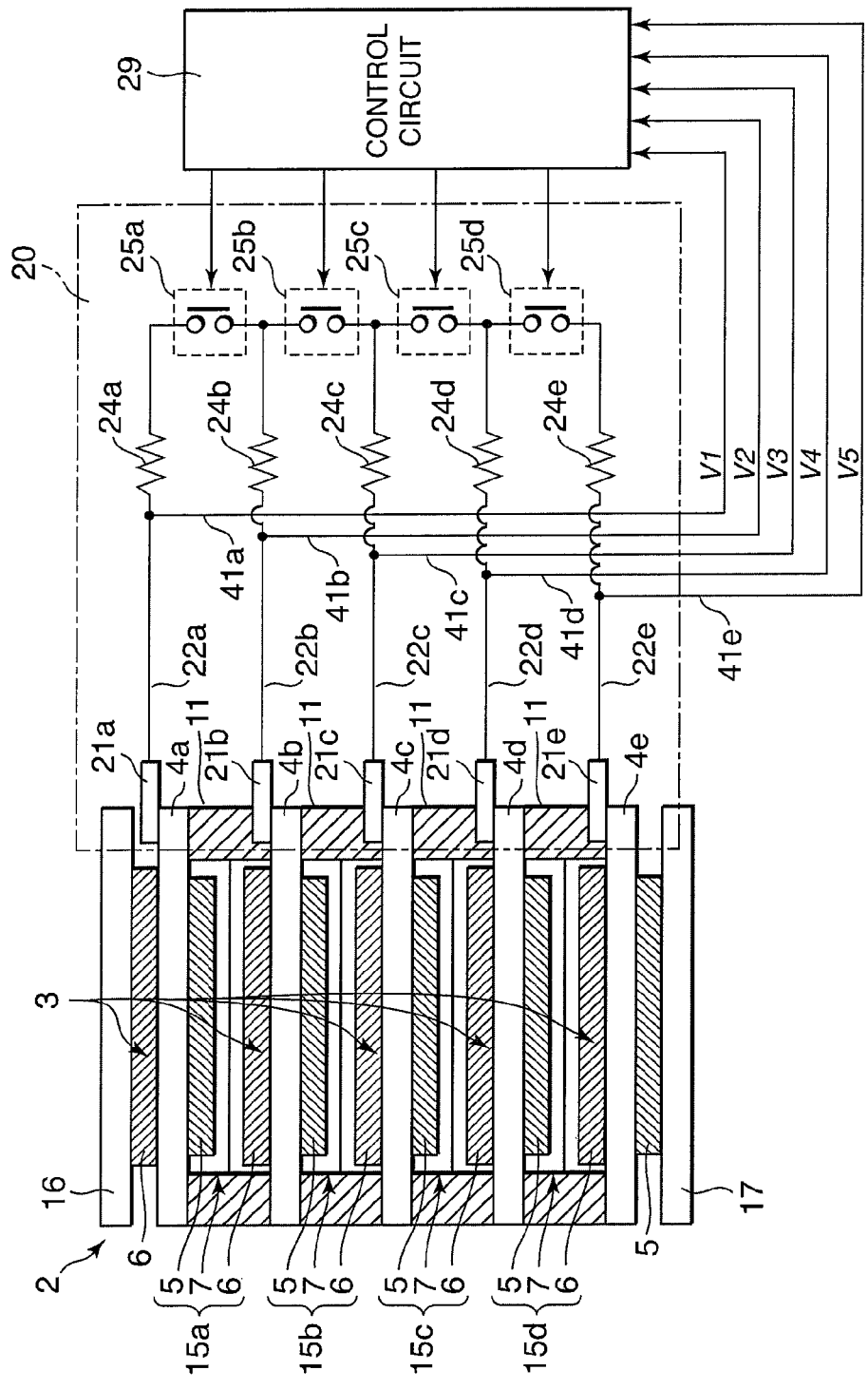
FIG. 5 is a diagram showing a voltage balance control circuit of a bipolar battery according to a comparative example #1.

Referring to FIG. 5, comparative example #1 not pertaining to this invention will be described.

In the bipolar battery 2 according to comparative example #1, the five discharge terminals 21a to 21e double as voltage detection terminals. More specifically, voltage detection wires 41a to 41e bifurcate from the five discharge wires 22a to 22e connected to the discharge terminals 21a to 21e, and the voltage detection wires 41a to 41e are connected to the control circuit 29. All other configurations of the bipolar battery 2 are identical to the bipolar battery 2 according to the first embodiment of this invention.

The discharge terminal 21a to 21e is connected to the surface of the collector 4a to 4e on which the negative electrode active material layer 6 is formed. For ease of description, however, a case in which the discharge terminal 21a to 21e is connected to the surface of the collector 4a to 4e on which the positive electrode active material layer 5 is formed will be described likewise in comparative example #1.

Figure 6A:
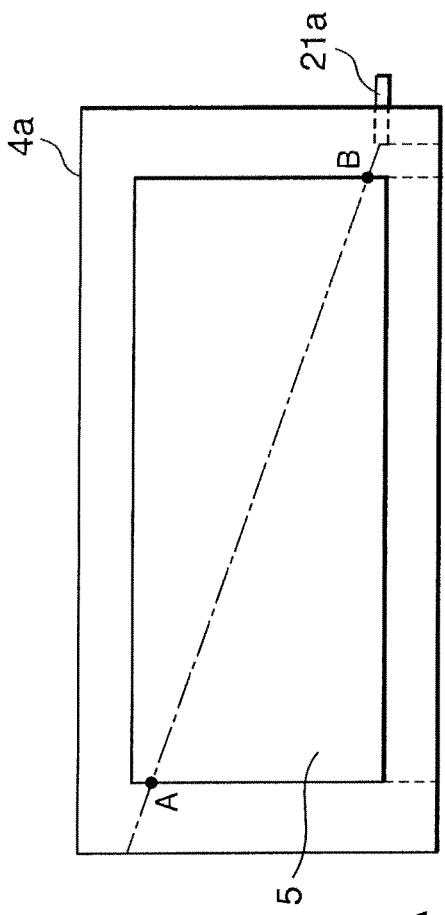
FIGS. 6A and 6B are a schematic plan view of a collector and a positive electrode active material layer of the bipolar battery according to the comparative example #1, and a diagram showing voltage variation in the interior of the collector according to the comparative example #1 during discharge.
Figure 6B:
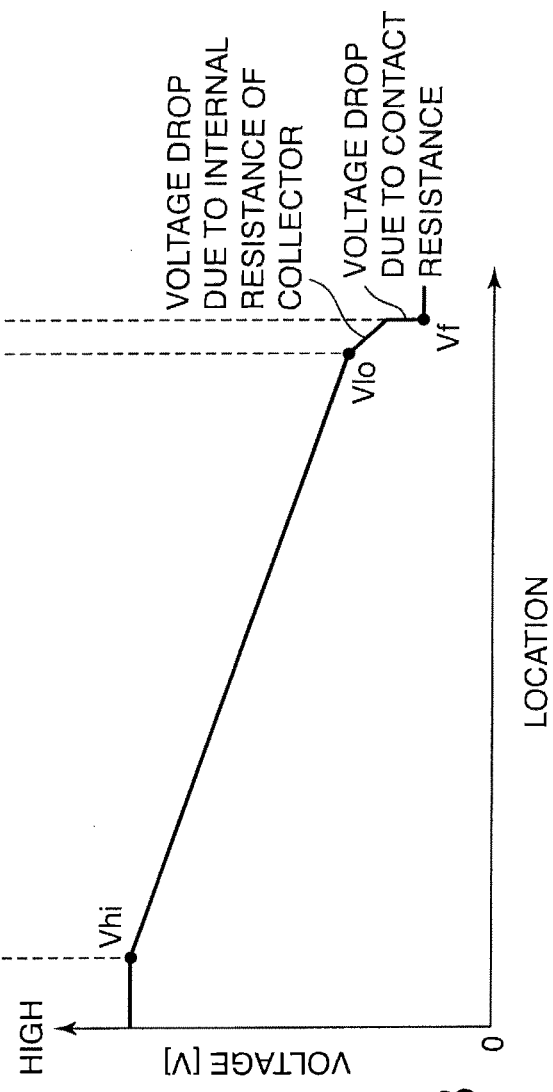

Referring to FIGS. 6A and 6B, the voltage reduction in the interior of the collector 4a (4b to 4e) caused by discharge of the unit cell 15a (15b to 15d) from the discharge terminal 21a (21b to 21e) is identical in comparative example #1 to that of the bipolar battery 2 according to the first embodiment of this invention.

As described above, however, when discharge is performed from the discharge terminals 21a to 21e, the current in the collectors 4a to 4e reaches a maximum in the vicinity of the discharge terminals 21a to 21e. Therefore, the voltage Vf detected here varies greatly. When the discharge terminals 21a to 21e double as voltage detection terminals, it is difficult to secure sufficient detection precision in relation to the voltage Vf, and as a result, it also becomes difficult to secure precision in the voltage balance control for aligning the voltages of the unit cells 15a to 15d at identical values.

Figure 7:
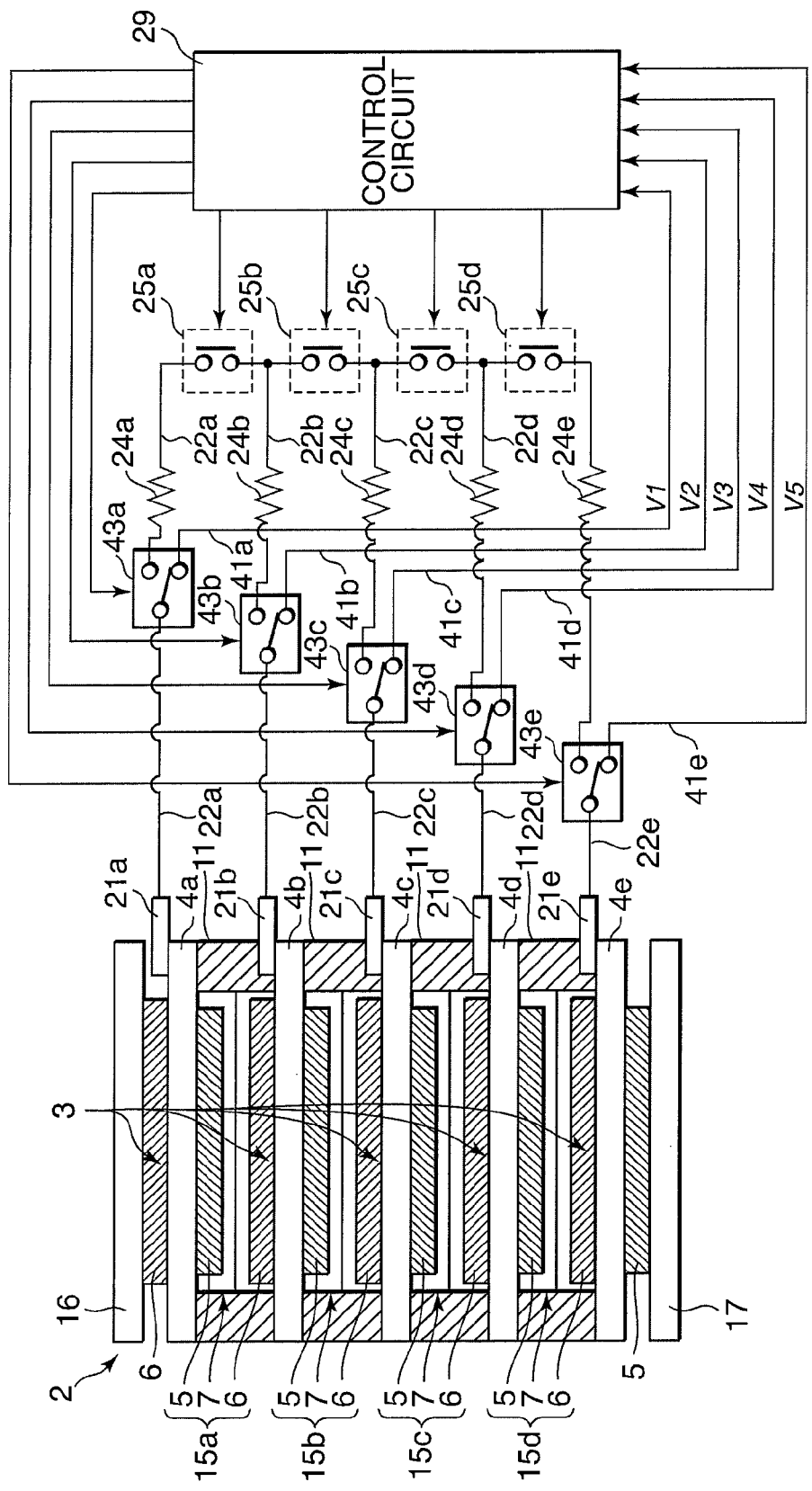
FIG. 7 is a diagram showing a voltage balance control circuit of a bipolar battery according to a comparative example #2.

Referring to FIG. 7, comparative example #2 not pertaining to this invention will be described.

Comparative example #2 differs from comparative example #1 in the configuration of the voltage balance circuit 20. The bipolar battery 2 is configured identically to the bipolar battery 2 according to comparative example #1.

In comparative example #2, switches 43a to 43e are disposed at bifurcation points where the voltage detection wires 41a to 41e bifurcate from the discharge wires 22a to 22e. The switches 43a to 43e are respectively connected to the control circuit 29 by a signal circuit. The switches 43a to 43e have a discharge position for connecting the discharge wires 22a to 22e to the fixed resistors 24a to 24e in response to a signal from the control circuit 29, and a voltage detection position for connecting the discharge wires 22a to 22e to the voltage detection wires 41a to 41e.

Similarly to the first embodiment, the bipolar battery 2 according to this embodiment is constructed by laminating the five bipolar electrodes 3 via the electrolyte layers 7.

Referring to FIGS. 9A and 9B, in comparative example #2, the control circuit 29 executes discharge and voltage detection on the collectors 4a to 4e alternately through time sharing by operating all or a part of the switches 43a to 43e. The voltage detection position is set as an initial condition of the switches 43a to 43e.

At times t1, t3, and t5, the control circuit 29 switches one of the switches 43a to 43e from the voltage detection position to the discharge position. At times t2 and t4, the control circuit 29 switches the switches in the discharge position to the voltage detection position so that all of the switches 43a to 43e are in the voltage detection position.

As a result, at times t1-t2, times t3-t4, and times t5-t6, at least a part of the switches 43a to 43e is held in the discharge position. These periods will be referred to as discharge periods. At times t0-t1, times t2-t3, and times t4-t5, all of the switches 43a to 43e are held in the voltage detection position. These periods will be referred to as voltage detection periods. The voltage detection period corresponds to a time required for the voltages V1 to V5 to stabilize following discharge of the unit cells 15a to 15d. In the discharge period, the control circuit 29 performs discharge from a specific collector 4a (4b to 4e), and in the voltage detection period, the control circuit 29 detects the voltages V1 to V5 of all of the collectors 4a to 4e and calculates the voltages ΔV1 to ΔV4 of the unit cells 15a to 15d.

A case in which the voltage ΔV3 of the unit cell 15c is lower than the voltages ΔV1, ΔV2, ΔV4 of the other three unit cells 15a, 15b, 15d will be considered. In this case, the control circuit 29 sets the voltage ΔV3 as the target voltage ΔVm, and causes the other three unit cells 15a, 15b, 15d to perform discharge until the voltages ΔV1, ΔV2, ΔV4 match the target voltage ΔVm.

A voltage detection and discharge pattern executed by the control circuit 29 will now be described.

First, the control circuit 29 detects the voltages V1 to V5 of the collectors 4a to 4e and calculates the voltages ΔV1 to ΔV4 of the four unit cells 15a to 15d in the voltage detection period of the times t0-t1. It is assumed as a result that the voltage ΔV3 of the unit cell 15c is lower than the voltages ΔV1, ΔV2, ΔV4 of the other three unit cells 15a, 15b, 15d.

Similarly to the first embodiment, as described with reference to FIGS. 3 and 4, in a certain discharge period, the control circuit 29 performs first stage discharge in order to reduce the voltage V2 of the unit cell 15b and the voltage V4 of the unit cell 15d by setting the switches 25b and 25d in the discharge position and keeping the other switches 25a and 25d in the voltage detection position. In a following discharge period, the control circuit 29 performs second stage discharge in order to reduce the voltage V1 of the unit cell 15a by keeping the switch 25a in the discharge position and keeping the other switches 25h to 25d in the voltage detection position.

Following this processing, the control circuit 29 again detects the voltages V1 to V5 and calculates the voltages $\Delta V1$ to $\Delta V4$ of the unit cells 15a to 15d in the voltage detection period, and then determines whether or not the voltages $\Delta V1$, $\Delta V2$, $\Delta V4$ of the unit cells 15a, 15b, 15d match the target voltage $\Delta Vm$.

Discharge from the unit cells 15a to 15d is normally performed so as to avoid overdischarge, and therefore, when the discharge processing constituted by the first stage and the second stage is performed only once, the voltages $\Delta V1$, $\Delta V2$, $\Delta V4$ may remain above the target voltage $\Delta Vm$. The control circuit 29 therefore calculates the voltages $\Delta V1$ to $\Delta V4$ on the basis of the voltages V1 to V5 and performs the discharge processing constituted by the first stage and the second stage repeatedly so that finally, all of the voltages $\Delta V1$ to $\Delta V4$ are aligned with the target voltage $\Delta Vm$.

By switching the switches 43a to 43d in comparative example #2, the voltages of the collectors 4a to 4e can be detected with greater stability than in comparative example #1. A large amount of time between ten and thirty minutes is required for the entire positive electrode active material layer 5 to settle at a voltage in a state of equilibrium from a point at which the two-stage discharge is stopped, or in other words for the voltage detection periods corresponding to the times t2-t3 and the times t4-t5 in FIG. 9A. Further, as described above, the voltages $\Delta V1$ to $\Delta V4$ of the four unit cells 15a to 15d cannot be made even in a single discharge operation, and therefore discharge must be repeated many times.

Figure 8A:
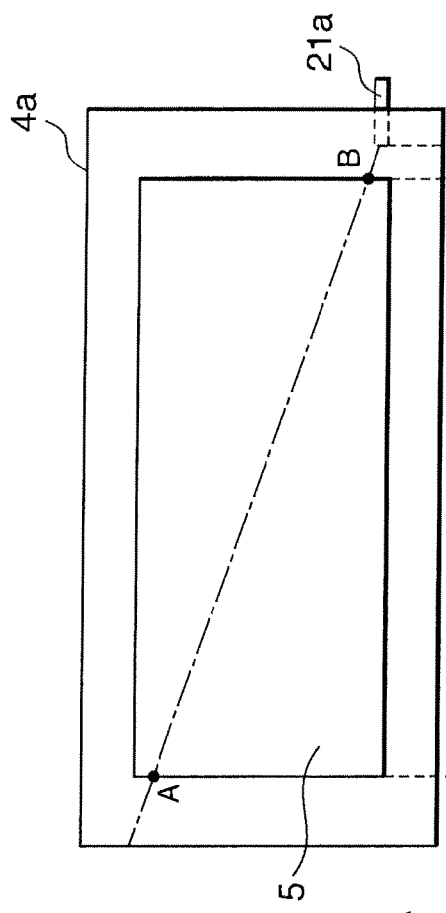
FIGS. 8A and 8B are a schematic plan view of a collector and a positive electrode active material layer of the bipolar battery according to the comparative example #2, and a diagram showing voltage variation in the interior of the collector according to the comparative example #2 during discharge.
Figure 8B:
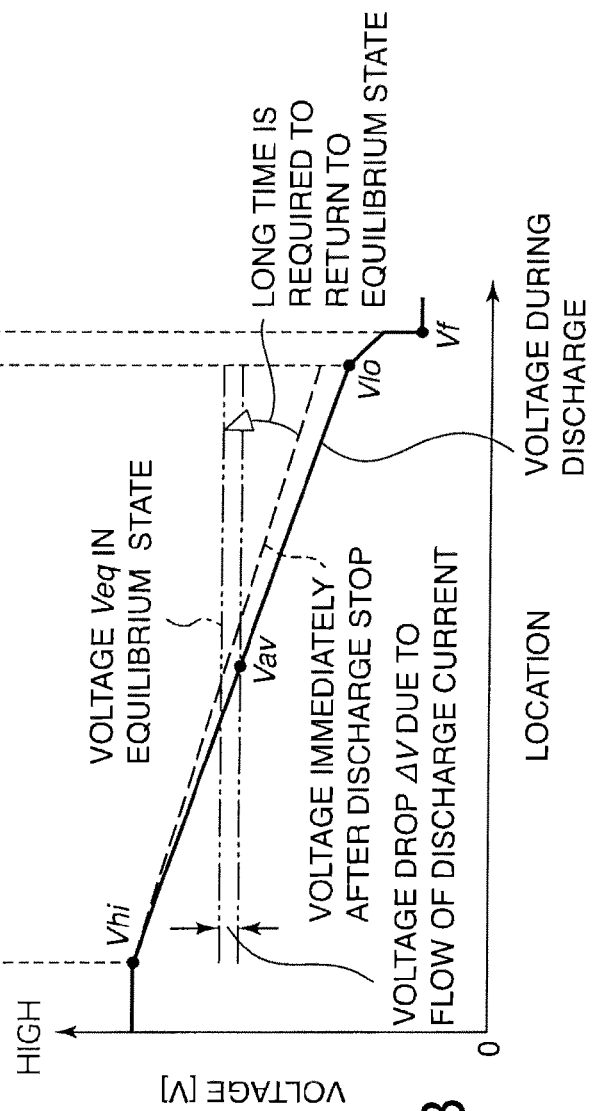

Referring to FIGS. 8A and 8B, voltage variation occurring in the collector 4a when discharge of the unit cell 15a according to comparative example #2 is stopped will be described.

It is assumed here for ease of description that the discharge terminal 21a to 21e is connected to the surface of the collector 4a to 4e on which the positive electrode active material layer 5 is formed rather than the formation surface of the negative electrode active material layer 6.

A solid line in FIG. 8B indicates voltage variation in respective parts of the collector 4a along a dot-dash line in FIG. 8A during discharge of the unit cell 15a from the discharge terminal 21a. A voltage reduction occurring during discharge is constituted by a voltage reduction due to lithium ion movement through the positive electrode active material layer 5 and a voltage reduction $\Delta V$ due to the flow of the discharge current. When discharge of the unit cell 15a is stopped, the voltage reduction $\Delta V$ due to the flow of the discharge current disappears instantaneously. In FIG. 8B, therefore, a voltage characteristic of each part of the collector 4a varies from the solid line to a dotted line of the figure when discharge is stopped. The voltage reduction increases as the flow of the discharge current increases, and therefore, when discharge from the unit cell 15a is stopped, the voltage varies greatly upward toward a site in the vicinity of the discharge terminal 21a.

The entire positive electrode active material layer 5 then shifts toward a state of equilibrium over a period of ten to thirty minutes, for example. After reaching the state of equilibrium, the entire region of the positive electrode active material layer 5 settles at a fixed voltage. A dot-dot-dash line in FIG. 8B shows this state of equilibrium. A voltage Veq in the state of equilibrium takes a value obtained by adding the voltage reduction $\Delta V$ due to the flow of the discharge current to the average value Vav (=(Vhi+Vlo)/2) of the high side voltage Vhf at the point A and the low side voltage Vlo at the point B during discharge.

Hence, in comparative example #2, a long time is required to align the voltages $\Delta V1$, $\Delta V2$, $\Delta V4$ of the unit cells 15a, 15b, 15d with the target voltage $\Delta Vm$, or in other words the voltage $\Delta V3$ of the unit cell 15c.

In the bipolar battery 2 according to the first embodiment of this invention, on the other hand, the discharge terminal 21a to 21e and the voltage detection terminal 27a to 27e are connected independently of each other on an identical collector 4a to 4e. Further, the discharge terminal 21a to 21e is disposed on the opposite side of the second straight line Da2, which is orthogonal to the first straight line Da1 that connects the centroid Oa to Oe of the collector 4a to 4e, and the voltage detection terminal 27a to 27e.

As a result, the voltages V1 to V5 of the collectors 4a to 4e can be detected in sites of the collectors 4a to 4e not affected by the in-plane voltage distribution of the collectors 4a to 4e and the voltage reduction caused by contact resistance between the collectors 4a to 4e and the discharge terminals 21a to 21e. Hence, the voltages $\Delta V1$ to $\Delta V4$ of the unit cells 15a to 15d can be calculated precisely. The voltage balance control executed on the unit cells 15a to 15d on the basis of the voltages $\Delta V1$ to $\Delta V4$ can also be performed precisely. In other words, both a requirement relating to measurement of the voltages of the collectors 4a to 4e and a requirement relating to discharge from the collectors 4a to 4e can be satisfied. As a result, it is possible to enlarge a voltage range in which the bipolar battery 2 can be used.

Further, in the bipolar battery 2 according to the first embodiment of this invention, when the planar form of the collector is divided into four regions by the two diagonal lines intersecting at the centroid Oa to Oe, the voltage detection terminal 27a to 27e is disposed in one of two non-adjacent regions, and the discharge terminal 21a to 21e is disposed in the other. As a result, the likelihood of the voltage detection terminals 27a to 27e being affected by voltage variation accompanying discharge from the collectors 4a to 4e can be reduced.

Furthermore, in the bipolar battery 2 according to the first embodiment of this invention, the two non-adjacent regions are regions in which an intersection angle of the two straight lines is an acute angle. As a result, the likelihood of the voltage detection terminals 27a to 27e being affected by voltage variation accompanying discharge from the collectors 4a to 4e can be reduced.

Moreover, in the bipolar battery 2 according to the first embodiment of this invention, the collectors 4a to 4e are formed with a rectangular planar form, and the two straight lines intersecting at the centroid Oa to Oe are the diagonal lines of the rectangle. Thus, a large distance can be secured between the voltage detection terminal 27a to 27e and the discharge terminal 21a to 21e, and as a result, the likelihood of the voltage detection terminals 27a to 27e being affected by voltage variation accompanying discharge from the collectors 4a to 4e can be reduced.

Further, in the bipolar battery 2 according to the first embodiment of this invention, the voltage detection terminal 27a to 27e and the discharge terminal 21a to 21e are disposed at an angular interval between 150 and 210 degrees. In so doing, a large distance can be secured between the voltage detection terminal 27a to 27e and the discharge terminal 21a to 21e, and as a result, the likelihood of the voltage detection terminals 27a to 27e being affected by voltage variation accompanying discharge from the collectors 4a to 4e can be reduced.

Hence, with the bipolar battery 2 according to the first embodiment of this invention, accurate voltage balance control can be performed, enabling an increase in the lifespan of the bipolar battery 2.

Figure 10:
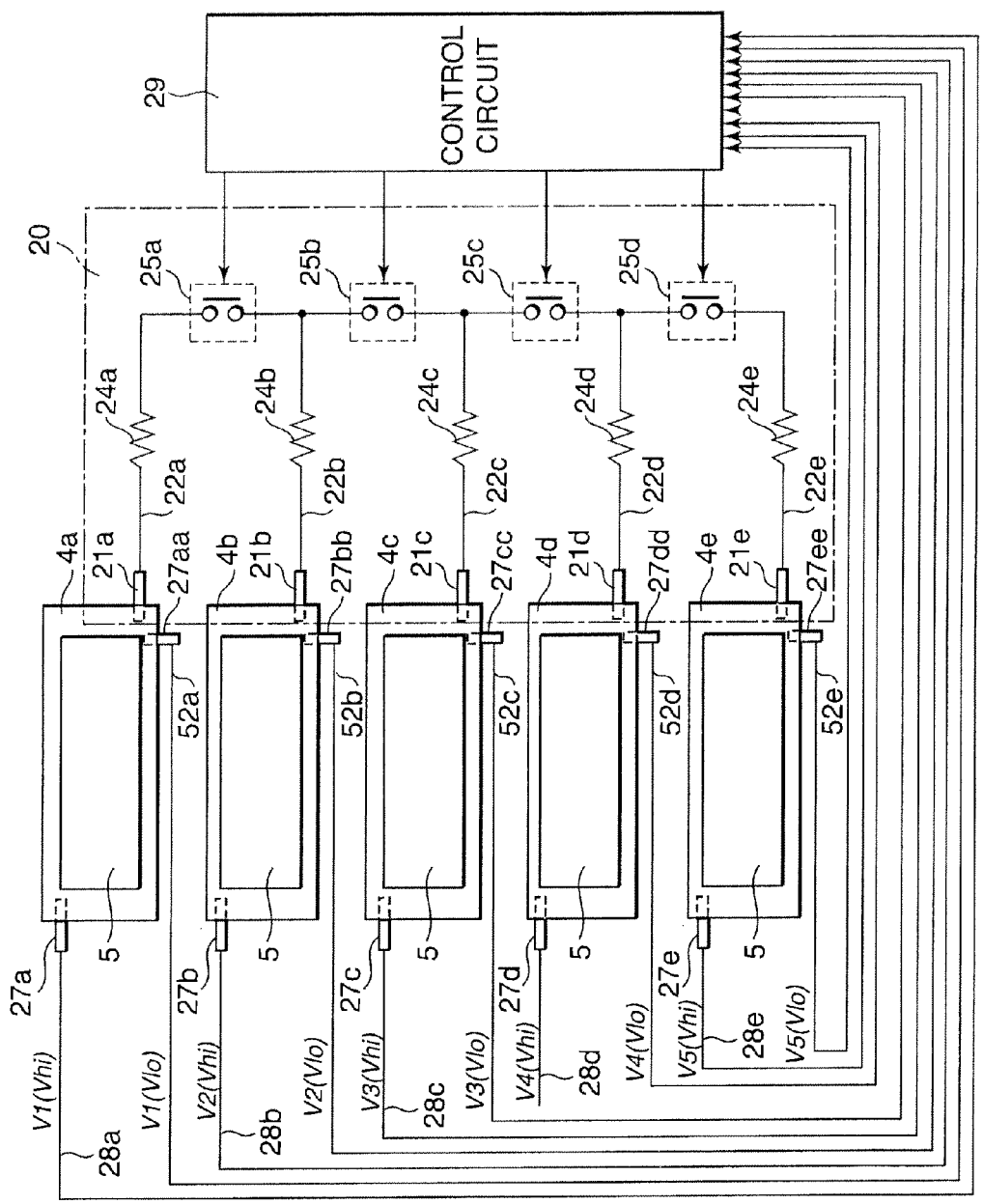
FIG. 10 is a diagram showing a voltage balance control circuit of a bipolar battery according to a second embodiment of this invention.

Referring to FIG. 10, a bipolar battery 2 according to second embodiment of this invention will be described.

In the bipolar battery 2 according to the first embodiment, one discharge terminal 21a to 21e and one voltage detection terminal 27a to 27e are connected to each collector 4a to 4e. In the bipolar battery 2 according to this embodiment, one discharge terminal 21a to 21e and two voltage detection terminals 27a to 27e, 27aa to 27ee are connected to each collector 4a to 4e.

The discharge terminal 21a to 21e and a first voltage detection terminal 27a to 27e of the two voltage detection terminals 27a to 27e, 27aa to 27ee are connected to the collector 4a to 4e in identical positions to the first embodiment.

A second voltage detection terminal 27aa to 27ee of the two voltage detection terminals 27a to 27e, 27aa to 27ee is connected to the collector 4a to 4e in the vicinity of the point B. It should be noted that the discharge terminal 21a to 21e and the two voltage detection terminals 27a to 27e, 27aa to 27ee are both connected to the surface of the collector 4a to 4e on which the negative electrode active material layer 6 is formed.

The second voltage detection terminals 27aa to 27ee are connected to the control circuit 29 via independent wires 52a to 52e.

All other configurations of the bipolar battery 2 and the voltage balance circuit 20 are identical to the first embodiment. FIG. 10 shows the planar form of the five collectors 4a to 4e, but similarly to the first embodiment, the bipolar battery 2 according to this embodiment is constituted by five bipolar electrodes 3 including the collectors 4a to 4e, which are laminated via the separators 12.

Figure 11A:
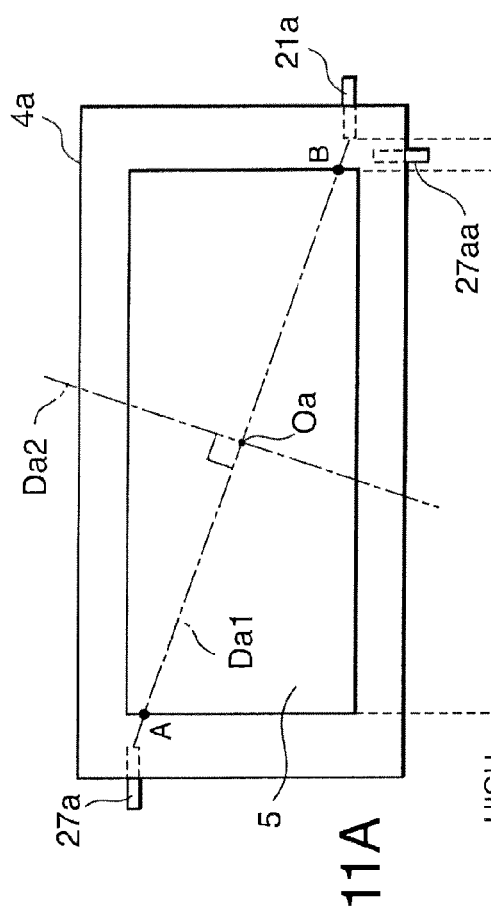
FIGS. 11A and 11B are a schematic plan view of a collector and a positive electrode active material layer of the bipolar battery according to the second embodiment of this invention, and a diagram showing voltage variation in the interior of the collector according to the second embodiment of this invention during discharge.

Referring to FIG. 11A, in the bipolar battery 2 according to this embodiment, a voltage detected by the first voltage detection terminal 27a to 27e is set as the high side voltage Vhi, while a voltage detected by the second voltage detection terminal 27aa to 27ee is set as the low side voltage Vlo. The average value Vav (=(Vhi+Vlo)/2) thereof is employed as the voltage of each collector 4a to 4e.

As described in relation to comparative example #2, a difference corresponding to the voltage reduction ΔV caused by the flow of the discharge current exists between the average value Vav of the high side voltage Vhi and the low side voltage Vlo and the balanced voltage Veq in the state of equilibrium after discharge has been stopped. Therefore, the voltage reduction ΔV is preferably determined in advance, and a value obtained by adding the voltage reduction ΔV to the average value Vav of the high side voltage Vhi and the low side voltage Vlo is preferably employed as the detected voltage of each collector 4a to 4e.

It should be noted that in order to facilitate the following description, it is assumed that the discharge terminal 21a to 21e and the two voltage detection terminals 27a to 27e, 27aa to 27ee are both connected to the surface of the collector 4a to 4e on which the positive electrode active material layer 5 is formed.

Figure 11B:
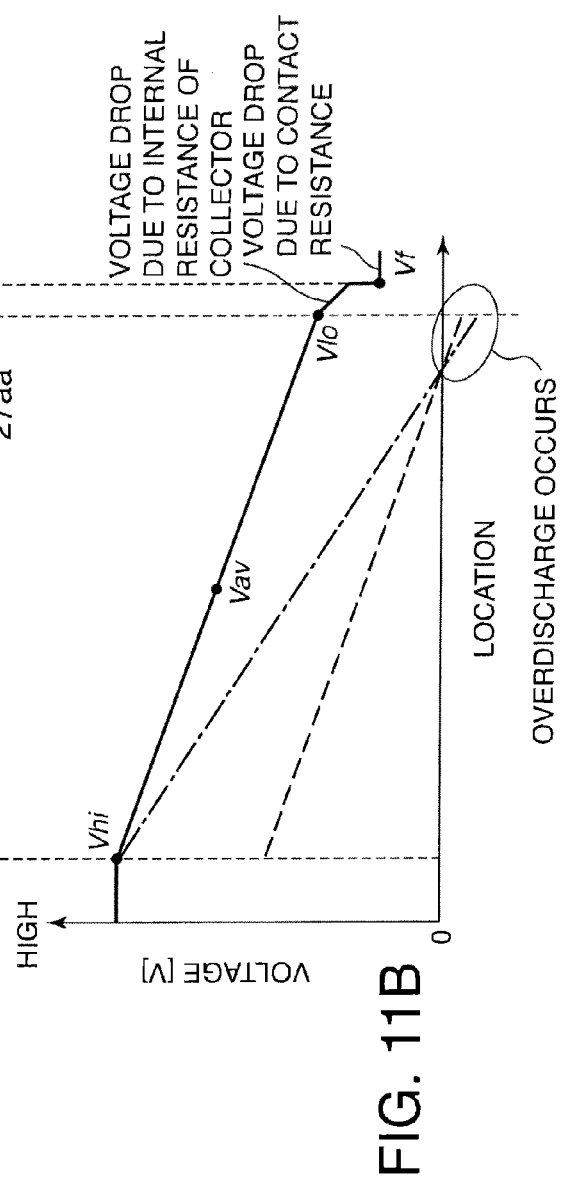

A solid line in FIG. 11B indicates voltage variation in respective parts of the collector 4a along a dot-dash line in FIG. 11A during discharge of the unit cell 15a from the discharge terminal 21a. In the figure, a straight line linking the high side voltage Vhi to the low side voltage Vlo represents a value of a current flowing through the collector 4a and the positive electrode active material layer 5 during discharge of the unit cell 15a. The current flowing through the collector 4a during discharge of the unit cell 15a is affected by environmental conditions. For example, if the value of the current flowing through the collector 4a during discharge of the unit cell 15a increases as an air temperature increases, an incline of the straight line linking the high side voltage Vhi to the low side voltage Vlo increases as the air temperature increases.

When a voltage distribution that decreases toward the discharge terminal 21a to 21e exists in all of the collectors 4a to 4e, the incline of the straight line may vary in response to the environmental conditions. In this embodiment, the high side voltage Vhi is detected by the first voltage detection terminal 27a to 27e and the low side voltage Vlo is detected by the second voltage detection terminal 27aa to 27ee. Hence, even when the incline of the straight line linking the high side voltage Vhi to the low side voltage Vlo varies, the voltage is detected in two locations such that the in-plane voltage distribution of the collector 4a to 4e is estimated from the straight line linking the voltages Vhi and Vlo of the two locations. As a result, a voltage distribution that decreases toward the discharge terminal 21a to 21d can be estimated with a high degree of precision during discharge of the unit cell 15a.

This embodiment also includes a following merit. In FIG. 11B, when the high side voltage Vhi is low, the low side voltage Vlo may fall below zero in the vicinity of the discharge terminal 21a, as shown by a dotted line in the figure, even though the current value during discharge, or in other words the incline of the straight line in the figure, remains unchanged. As a result, overdischarge occurs locally in the vicinity of the discharge terminal 21a. The low side voltage Vlo may also fall below zero in the vicinity of the discharge terminal 21a when the discharge current value is too large, or in other words when the incline of the straight line in the figure is too large. Likewise in this case, overdischarge occurs locally in the vicinity of the discharge terminal 21a.

When the voltage detection terminal 27aa to 27ee is not connected to the collector 4a in the vicinity of the point B, overdischarge occurring locally in the vicinity of the discharge terminal 21a is overlooked. By having the voltage detection terminal 27aa to 27ee detect the low side voltage Vlo, however, a determination can be made as to whether or not the low side voltage Vlo is close to zero. As a result, the balance current can be reduced such that the low side voltage Vlo is prevented from falling below zero.

To reduce the balance current of the unit cells 15a to 15d, variable resistors may be provided in place of the fixed resistors 24a to 24e shown in FIG. 10, for example, so that a variable resistance value can be increased in response to a signal from the control circuit 29.

Hence, according to the second embodiment of this invention, similar favorable effects to those of the first embodiment can be obtained in relation to the detection precision of the voltages V1 to V5. Further, by providing the second voltage detection terminals 27aa to 27ee in the vicinity of the discharge terminals 21a to 21e, the precision with which the voltages of the collectors 4a to 4e are detected during discharge can be improved, and local overdischarge in the vicinity of the discharge terminals 21a to 21e can be prevented. Therefore, an even more favorable effect is obtained in terms of increasing the lifespan of the bipolar battery 2.

Figure 12:
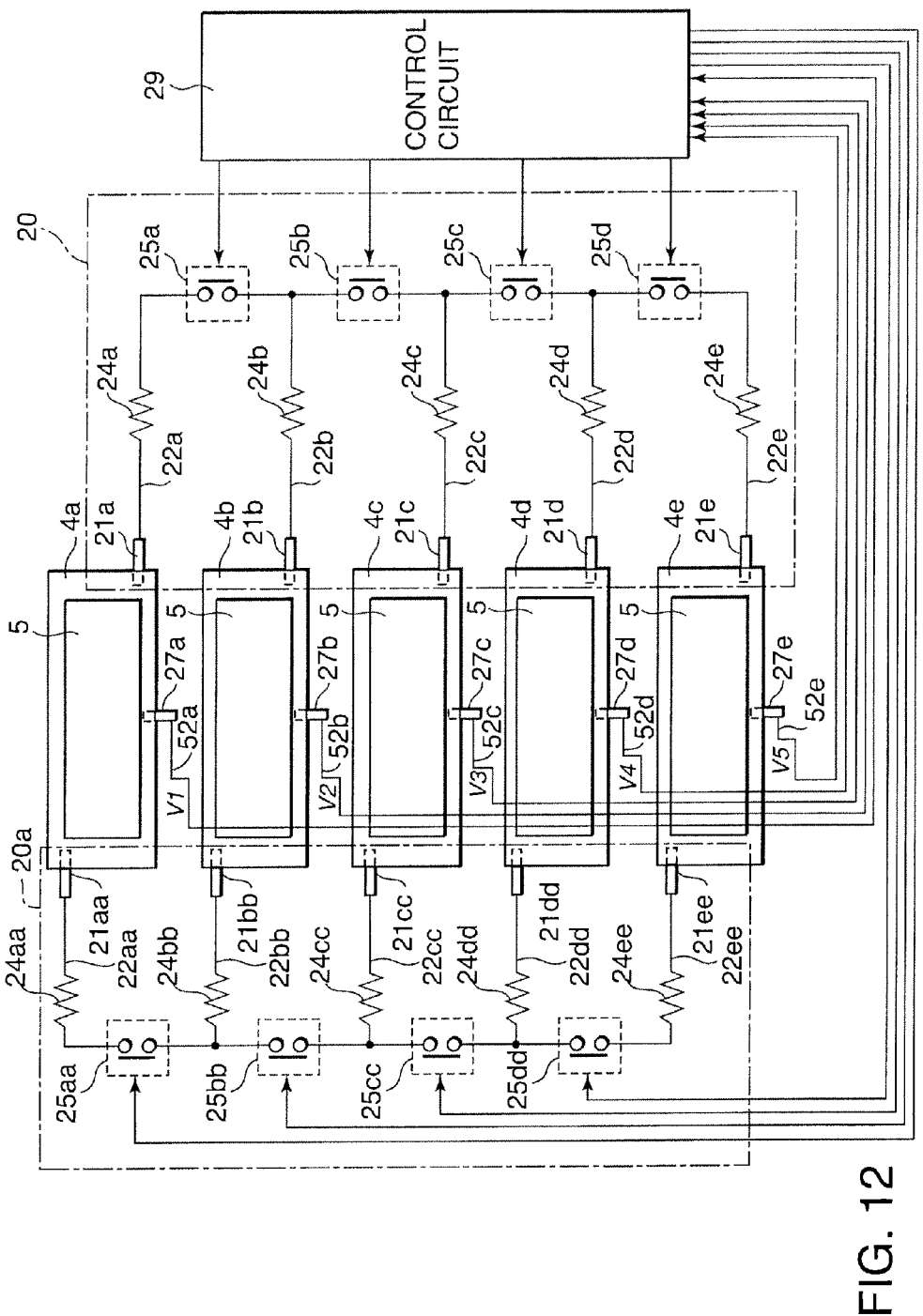
FIG. 12 is a diagram showing a voltage balance control circuit of a bipolar battery according to a third embodiment of this invention.

Referring to FIG. 12, a third embodiment of this invention will be described.

Similarly to FIG. 10, this figure shows the planar form of the five collectors 4a to 4e, but similarly to the first embodiment, the bipolar battery 2 according to this embodiment is constituted by five bipolar electrodes 3 including the collectors 4a to 4e, which are laminated via the separators 12.

In the bipolar battery 2 according to the first embodiment, one discharge terminal 21a to 21e and one voltage detection terminal 27a to 27e are connected to each collector 4a to 4e, whereas in the bipolar battery 2 according to this embodiment, two discharge terminals 21a to 21e, 21aa to 21ee and one voltage detection terminal 27a to 27e are connected to each collector 4a to 4e.

A first discharge terminal 21a to 21e of the two discharge terminals 21a to 21e, 21aa to 21ee connected to the collector 4a to 4e is disposed in an identical position to the first embodiment.

A second discharge terminal 21aa to 21ee of the two discharge terminals 21a to 21e, 21aa to 21ee is connected to the collector 4a to 4e in the vicinity of the point A. In other words, the two discharge terminals 21a to 21e and 21aa to 21ee are substantially point-symmetrical.

The voltage detection terminal 27a to 27e, meanwhile, is connected to the collector 4a to 4e in the vicinity of an intermediate position on one long side of the collector 4a to 4e having a rectangular planar form.

Referring to FIG. 13A, a positional relationship between the discharge terminals 21a, 21aa and the voltage detection terminal 27a on the collector 4a will be described. First, the first straight line Da1 connecting the centroid Oa of the collector 4a and the voltage detection terminal 27a is drawn. The second discharge terminal 21 as is then disposed on the opposite side of the second straight line Da2, which is orthogonal to the first straight line Da1 at the centroid Oa, to the voltage detection terminal 27a. The first discharge terminal 21a, on the other hand, is disposed on the same side of the second straight line Da2 as the voltage detection terminal 27a.

Likewise with regard to the collectors 4b to 4d, the two discharge terminals 21b to 21e, 21bb to 21ee and the voltage detection terminals 27b to 27e are disposed in the same way as in the case of the collector 4a.

In this embodiment, due to the arrangement described above, the voltage detection terminal 27a to 27e and the second discharge terminal 21aa to 21ee satisfy the requirements of the bipolar battery 2 according to this invention.

It should be noted that the two discharge terminals 21a to 21e, 21aa to 21ee and the voltage detection terminal 27a to 27e are all connected to the surface of the collector 4a to 4e on which the negative electrode active material layer 6 is formed.

Likewise here, to facilitate the following description, a case in which the two discharge terminals 21a to 21e, 21aa to 21ee and the voltage detection terminal 27a to 27e are all connected to the surface of the collector 4a to 4e on which the positive electrode active material layer 5 is formed will be envisaged.

In this embodiment, a second voltage balance circuit 20a connected to the second discharge terminals 21aa to 21ee is provided in addition to the first voltage balance circuit 20, which is connected to the first discharge terminals 21a to 21e in a similar manner to the first embodiment.

The second voltage balance circuit 20a is configured as follows.

The second voltage balance circuit 20a includes second discharge wires 22aa to 22ee, second fixed resistors 24aa to 24ee, and second switches 25aa to 25dd, which are connected to the five second discharge terminals 21aa to 21ec.

One end of the second discharge wire 22aa to 22ee is connected to each of the five second discharge terminals 21aa to 21ee.

More specifically, one end of the second discharge wire 22aa is connected to the second discharge terminal 21aa. One end of the second discharge wire 22bb is connected to the second discharge terminal 21bb. One end of the second discharge wire 22cc is connected to the second discharge terminal 21cc. One end of the second discharge wire 22dd is connected to the second discharge terminal 21dd. One end of the second discharge wire 22ee is connected to the second discharge terminal 21ee.

Another end of the second discharge wire 22aa and another end of the second discharge wire 22bb are connected to the switch 25aa. The other end of the second discharge wire 22bb and another end of the second discharge wire 22cc are connected to the second switch 25bb. The other end of the second discharge wire 22cc and another end of the second discharge wire 22dd are connected to the second switch 25cc. The other end of the second discharge wire 22dd and another end of the second discharge wire 22ee are connected to the second switch 25dd.

The four second switches 25aa to 25dd are normally open switches. ON/OFF operations of the second switches 25aa to 25dd are controlled by the control circuit 29 together with the ON/OFF operations of the first switches 25a to 25d.

The control circuit 29 switches the first switch 25a and the second switch 25aa simultaneously. More specifically, the first switch 25a is switched from OFF to ON at the same time as the second switch 25aa is switched from OFF to ON. Further, the first switch 25b and the second switch 25bb are operated similarly. The first switch 25c and the second switch 25cc are also operated similarly. The first switch 25d and the second switch 25dd are also operated similarly.

It should be noted that components used in the two voltage balance circuits 20 and 20a have identical specifications with respect to the four unit cells 15a to 15d. More specifically, the ten discharge terminals 21a to 21e and 21aa to 21ee have identical specifications. The eight switches 25a to 25d and 25aa to 25dd all have identical specifications. The ten discharge wires 22a to 22e and 22aa to 22ee also have identical specifications. The ten fixed resistors 24a to 24e and 24aa to 24ee all have identical resistance values. The five voltage detection terminals 27a to 27e and the five voltage detection wires 28a to 28e also have identical specifications.

In this embodiment, the two voltage balance circuits 20 and 21 are provided, and therefore approximately double the balance current can be discharged during the voltage balance control in comparison with the bipolar battery 2 according to the first embodiment. In other words, a time required for the voltage balance control can be shortened to approximately half.

The reason for connecting the voltage detection terminals 27a to 27e to the collectors 4a to 4e in the vicinity of an intermediate position on one long side of the collectors 4a to 4e having a rectangular planar form is that this position is furthest removed from both the first discharge terminals 21a to 21e and the second discharge terminals 21aa to 21ee, and therefore corresponds to the position in which the smallest amount of discharge current flows, or in other words the position in which the voltage is stable.

Referring to FIG. 13B, a solid line in this figure indicates voltage characteristics in respective parts of the collector 4a along a dot-dash line in FIG. 13A during discharge of the unit cell 15a. In the bipolar battery 2, discharge is performed from the first discharge terminal 21a to 21e and the second discharge terminal 21aa to 21ee connected to the two short sides of the rectangular collector 4a to 4e, and therefore the voltage distribution through the interior of the collector 4a to 4e takes a mountain shape in which a highest voltage Vpe appears at a point C, which corresponds to an intermediate point of the dot-dash line in FIG. 13A, and the voltage decreases from the point C toward a point A and a point B on either side thereof. Hence, in the bipolar battery 2, a range width of the voltage distribution between the point A and the point B is substantially half that of the bipolar battery 2 according to the first embodiment.

The balance current discharged from the first discharge terminal 21a to 21e is equal to the balance current discharged from the second discharge terminal 21aa to 21ee, and therefore the voltage distribution characteristic exhibits left/right symmetry, as shown in the figure. An absolute value of the incline of the straight line is identical to that of the bipolar battery 2 according to the first embodiment, in which discharge is performed from only one location of the collector 4a to 4e. As a result, a voltage difference between the peak voltage Vpe and the low side voltage Vlo is exactly half the voltage difference between the high side voltage Vhi and the low side voltage Vlo in the first embodiment, shown in FIG. 2B. In other words, the peak voltage Vpe is equal to the average value Vav of the first embodiment.

In this embodiment, the voltage of the collector 4a to 4e corresponds to an average value Vav2 (=(Vpe+Vlo)/2) of the peak voltage Vpe and the low side voltage Vlo. However, this embodiment does not include a voltage detection terminal for detecting the low side voltage Vlo, and the voltage detection terminal 27a to 27e detects only the peak voltage Vpe.

Hence, the peak voltage Vpe, which appears to be larger than the average voltage Vav2, is used as the representative voltage value of the collector 4a to 4e during discharge. When a high degree of detection precision is not required, discharge control may be performed on the basis of the peak voltage Vpe. When a high degree of detection precision is required, a difference between the peak voltage Vpe and the average value Vav2 of the collector 4a may be determined in advance by matching, and a value obtained by subtracting this predetermined difference from the peak voltage Vpe detected by each voltage detection terminal 27a to 27e may be used as the detected voltage of each collector 4a to 4e. More specifically, a relationship between the peak value Vpe of the collector 4a, the peak value Vpe of the discharge destination collector 4b, and the average voltage value Vav of the collector 4a is preferably stored in advance on a map, whereupon the average value Vav is determined from the peak voltages Vpe of the collectors 4a and 4b by referring to the map. The map is created by matching.

In the bipolar battery 2 according to this embodiment, the voltage detection terminal 27a to 27e is removed from the point C positioned in the center of the collector 4a to 4e. Therefore, a voltage reduction corresponding to a distance between the voltage detection terminal 27a to 27e and the point C is interposed between the voltage detected by the voltage detection terminal 27a to 27e and the voltage at the point C. By determining this voltage reduction in advance and adding the voltage reduction to the peak voltage Vpe detected by the voltage detection terminal 27a to 27e, the peak voltage at the point C can be determined with a high degree of precision.

A manner in which the voltage varies in the interior of the collector 4a to 4e of the bipolar battery 2 from the point at which discharge is stopped onward will be described below, taking the collector 4a as an example.

When discharge is stopped, the voltage reduction ΔV caused by the flow of the discharge current disappears instantaneously. In FIG. 13B, therefore, the voltage characteristic of each part of the collector 4a varies from the solid line to a dotted line of the figure when discharge is stopped. The voltage reduction increases as the flow of the discharge current increases, and therefore, when discharge from the unit cell 15a is stopped, the voltage varies greatly upward toward sites in the vicinity of the first discharge terminal 21a and the second discharge terminal 21aa.

The entire positive electrode active material layer 5 then shifts toward a state of equilibrium over a period of ten to thirty minutes, for example. After reaching the state of equilibrium, the voltage of the collector 4 settles at the balanced voltage Veq over the entire region of the positive electrode active material layer 5. A dot-dot-dash line in FIG. 13B shows this state of equilibrium. The balanced voltage Veq takes a value obtained by adding the voltage reduction ΔV due to the flow of the discharge current to the average value Vav2 (=(Vpe+Vlo)/2) of the peak voltage Vpe and the low side voltage Vlo. Further, a time extending from a condition in which an incline occurs in the voltage distribution, or in other words the condition shown by the solid line in the figure, to the state of equilibrium shown by the dot-dot-dash line in the figure, is a "time required for the voltage distribution to be resolved". In this embodiment, the second discharge terminal 21aa to 2 lee is provided in addition to the first discharge terminal 21a to 21e, and therefore the voltage difference in the collector 4a to 4e during discharge is a half that of the bipolar battery 2 according to the first embodiment. Hence, with the bipolar battery 2 according to this embodiment, the time required for the voltage distribution to be resolved is also a half that of the bipolar battery 2 according to the first embodiment. By reducing the difference in the voltage distribution of the collector 4a to 4e in this manner, overdischarge is less likely to occur, enabling an increase in the lifespan of the battery.

Figure 14:
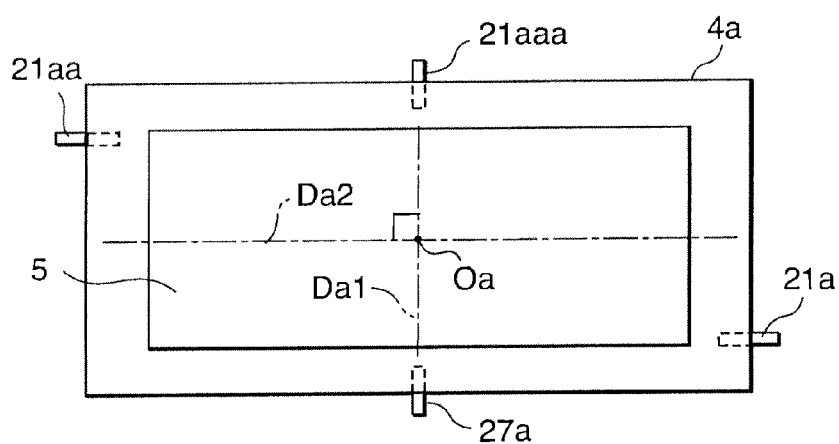
FIG. 14 is a schematic plan view of a collector and a positive electrode active material layer of a bipolar battery according to a fourth embodiment of this invention.

Referring to FIG. 14, a fourth embodiment of this invention will be described.

In the bipolar battery 2 according to this embodiment, three discharge terminals 21a, 21aa, 21aaa and one voltage detection terminal 27a are provided on the collector 4a. More specifically, the collector 4a according to this embodiment is formed by adding the third discharge terminal 21aaa to the collector 4a of the third embodiment.

The third discharge terminal 21aaa is connected to the collector 4a in the vicinity of an intermediate position of the other long side of the collector 4a having a rectangular planar form, i.e. the long side to which the voltage detection terminal 27a is not connected.

The other collectors 4b to 4e likewise include third discharge terminals 21bbb to 21eee disposed similarly to the third discharge terminal 21aaa.

In this embodiment, the requirements of the bipolar battery 2 according to this invention are satisfied by a positional relationship between the voltage detection terminal 27a to 27e, the second discharge terminal 21aa to 21ee, and the third discharge terminal 21aaa to 21eee.

Further, a third voltage balance circuit configured similarly to the first and second voltage balance circuits 20, 20a is provided for the third discharge terminals 21aaa to 21eee.

According to this embodiment, by providing three voltage balance circuits, approximately three times the balance current can be discharged during the voltage balance control in comparison with the bipolar battery 2 according to the first embodiment, and therefore the time required for the voltage balance control can be shortened to approximately one third that of the bipolar battery 2 according to the first embodiment. Furthermore, the voltage difference in the collector 4a to 4e during discharge can be reduced greatly in comparison with the bipolar battery 2 according to the first embodiment.

Figure 15:
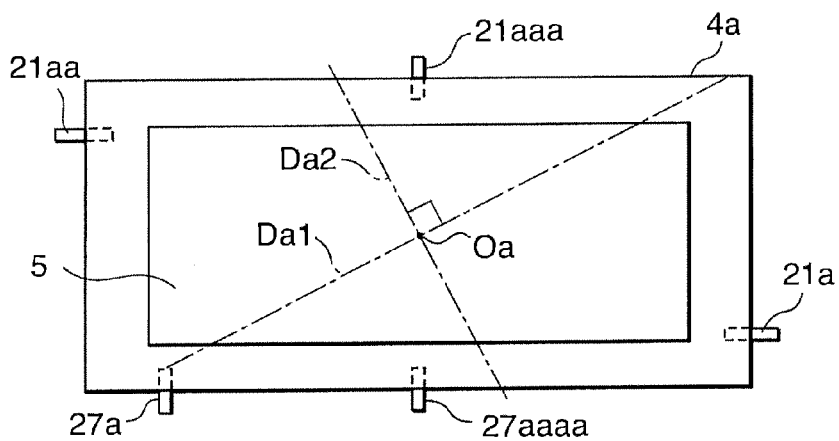
FIG. 15 is a schematic plan view of a collector and a positive electrode active material layer of a bipolar battery according to a fifth embodiment of this invention.

Referring to FIG. 15, a fifth embodiment of this invention will be described.

In this embodiment, a fourth discharge terminal 21aaaa is further added to the collector 4a to 4e of the bipolar battery 2 according to the fourth embodiment.

In the bipolar battery 2 according to this embodiment, the fourth discharge terminal 21aaaa is connected to the collector 4a in the position of the voltage detection terminal 27a according to the third embodiment, and the voltage detection terminal 27a is moved to an end portion of the collector 4a to which the fourth discharge terminal 21aaaa is connected. With this arrangement, the voltage detection terminal 27a is provided in a position removed from all of the discharge terminals 21a, 21aa, 21aaa, 21aaaa.

The other collectors 4b to 4e likewise include fourth discharge terminals 21bbbb to 21eeee disposed similarly to the fourth discharge terminal 21aaaa.

In this embodiment, the requirements of the bipolar battery 2 according to this invention are satisfied by a positional relationship between the voltage detection terminal 27a to 27e, the first discharge terminal 21a to 21e, and the third discharge terminal 21aaa to 21eee.

Further, a fourth voltage balance circuit configured similarly to the first and second voltage balance circuits 20, 20a is provided for the fourth discharge terminals 21aaaa to 21eeee.

According to this embodiment, by providing four voltage balance circuits, approximately four times the balance current can be discharged during the voltage balance control in comparison with the bipolar battery 2 according to the first embodiment, and therefore the time required for the voltage balance control can be shortened to approximately one quarter that of the bipolar battery 2 according to the first embodiment. Furthermore, the voltage difference in the collector 4a to 4e during discharge can be reduced even further in comparison with the bipolar battery 2 according to the fourth embodiment.

Figure 16A:
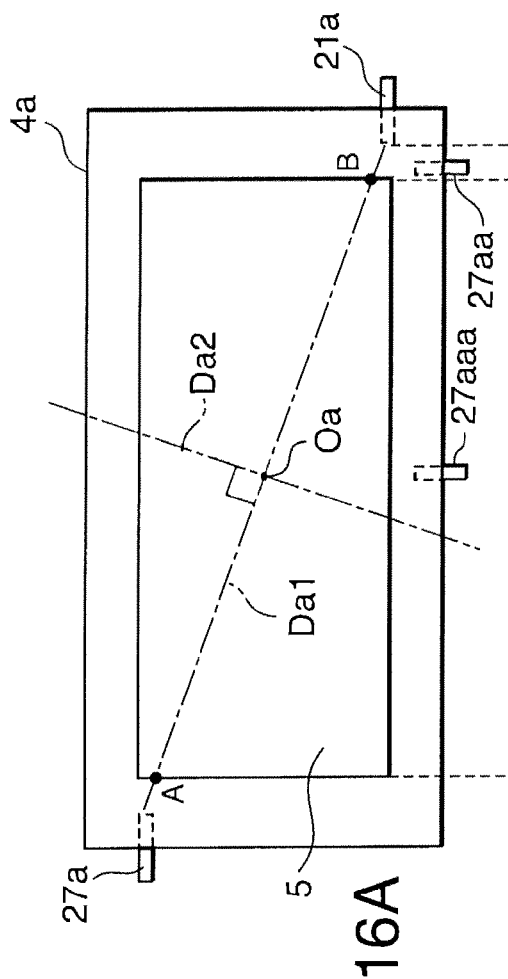
FIGS. 16A and 16B are a schematic plan view of a collector and a positive electrode active material layer of a bipolar battery according to a sixth embodiment of this invention, and a diagram showing voltage variation in the interior of the collector during discharge.
Figure 16B:
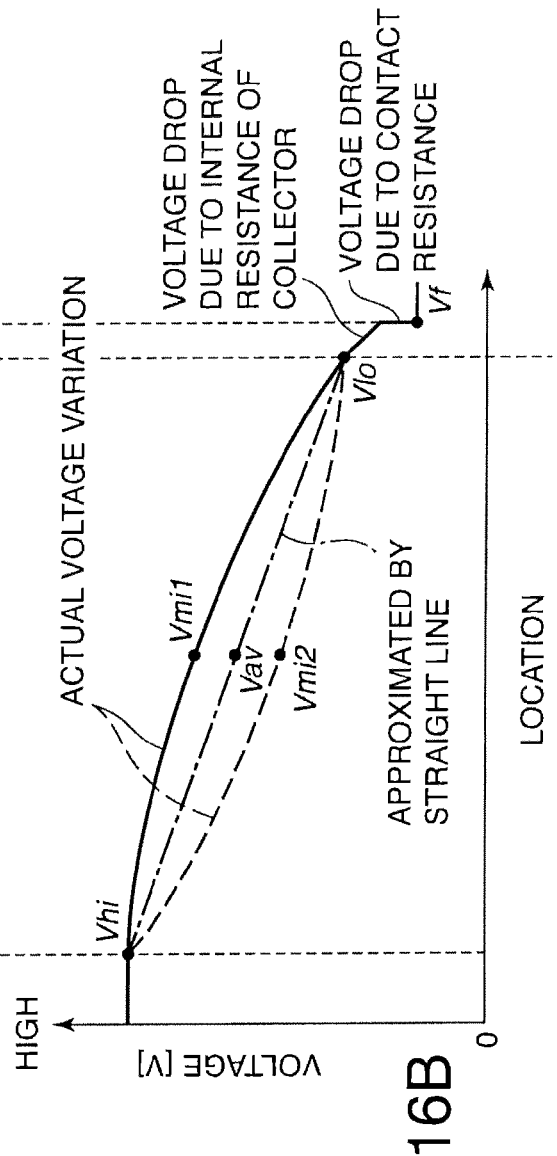

Referring to FIGS. 16A and 16B, a sixth embodiment of this invention will be described.

In the bipolar battery 2 according to this embodiment, three voltage detection terminals 27a to 27e, 27aa to 27ee, 27aaa to 27eee and one discharge terminal 21a to 21e are provided for each collector 4a to 4e.

The three voltage detection terminals 27a to 27e, 27aa to 27ee, 27aaa to 27eee and the one discharge terminal 21a to 21e are connected to the surface of the collector 4a to 4e on which the negative electrode active material layer 6 is formed. In the following description, however, similarly to the other embodiments, a case in which the terminals are connected to the surface of the collector 4a to 4e on which the positive electrode active material layer 5 is formed will be envisaged.

The arrangement of the first voltage detection terminal 27a to 27e and the discharge terminal 21a to 21e on the collector 4a to 4e is identical to that of the bipolar battery 2 according to the first embodiment.

The second voltage detection terminal 27aa to 27ee is connected to the collector 4a to 4e in the vicinity of the point B. The third voltage detection terminal 27aaa to 27eee is connected to the collector 4a to 4e in the vicinity of an intermediate position on one long side of the collector 4a to 4e having a rectangular planar form.

In this embodiment, the requirements of the bipolar battery 2 according to this invention are satisfied by a positional relationship between the first voltage detection terminal 27a to 27e and the discharge terminal 21a to 21e.

The voltage detection terminals 27a to 27e, 27aa to 27ee, 27aaa to 27eee are connected to the control circuit 29 respectively via dedicated wires.

In the first to fifth embodiments, only one voltage detection terminal 27a to 27e is connected to each collector 4a to 4e such that voltage variation in the interior of the collector 4a to 4e during discharge appears as a straight line. However, the voltage in the interior of the collector 4a to 4e may vary in a curved shape, as shown by a solid line and a dotted line in FIG. 16B.

When the voltage in the interior of the collector 4a varies along a curve that bulges upward from the point A to the point B, as shown by the solid line in the figure, and a voltage in an intermediate position is set as an intermediate voltage value Vmil, the intermediate voltage value Vmil is larger than the average value Vav. When, in this case, the voltage in the interior of the collector 4a is expressed by a straight line linking the high side voltage Vhi at the point A to the low side voltage Vlo at the point B, an error corresponding to a difference between the intermediate voltage value Vmil and the average value Vav occurs in relation to the estimated voltage of the collector 4a, and as a result, the precision with which the voltages of the collectors 4a to 4e are calculated decreases. Conversely, when the voltage in the interior of the collector 4a varies along a curve that bulges downward from the point A to the point B, as shown by the dotted line in the figure, and the voltage in the intermediate position between the point A and the point B is set as an intermediate voltage value Vmil2, the intermediate voltage value Vmil2 is smaller than the average value Vav. When, in this case, the voltage in the interior of the collector 4a is expressed by a straight line linking the high side voltage Vhi at the point A to the low side voltage Vlo at the point B, an error corresponding to a difference between the intermediate voltage value Vmil2 and the average value Vav occurs in relation to the estimated voltage of the collector 4a, and as a result, the precision with which the voltages of the collectors 4a to 4e are calculated decreases.

In this embodiment, the first voltage detection terminal 27a to 27e is disposed in the vicinity of the point A, the second voltage detection terminal 27aa to 27ee is disposed in the vicinity of the point B, and the third voltage detection terminal 27aaa to 27eee is disposed in an intermediate position on one long side of the rectangle forming the collector 4a to 4e. Therefore, the intermediate voltage values Vmil1 and Vmil2 in the intermediate portion of the straight line linking the point A and the point B in FIG. 16A can be detected by the third voltage detection terminal 27aaa to 27eee.

As a result, the control circuit 29 can estimate the voltage distribution through the interior of the collector 4a to 4e more accurately using the high side voltage Vhi detected by the first voltage detection terminal 27a to 27e, the low side voltage Vlo detected by the second voltage detection terminal 27aa to 27ee, and the intermediate voltage value Vmil (Vmil2) detected by the third voltage detection terminal 27aaa to 27eee.

The contents of Tokugan 2010-195792, with a filing date of Sep. 1, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiments described above, the collector 4a to 4e has a flat rectangular planar form, but the planar form of the collector 4a to 4e is not limited thereto and may take any form, including a square shape and a circular shape.

INDUSTRIAL APPLICABILITY

As described above, the bipolar battery according to this invention can satisfy both a requirement relating to voltage measurement and a requirement relating to discharge from a collector. Therefore, by applying this invention to a bipolar battery installed in an electric automobile or the like, a favorable effect can be expected in terms of extending the lifespan of the battery.

The embodiments of this invention in which an exclusive property or privilege is claimed are defined as follows:

1. A bipolar battery in which a plurality of bipolar electrodes, each comprising a layer-form collector, a positive electrode active material layer disposed on one surface of the collector, and a negative electrode active material layer disposed on another surface of the collector, and a plurality of electrolyte layers through which ions move internally are laminated in a state where the positive electrode active material layer and the negative electrode active material layer oppose each other via the electrolyte layer, wherein the collector comprises a voltage detection terminal and a discharge terminal connected to a peripheral edge portion thereof, and assuming a first straight line that connects a centroid of the collector and the voltage detection terminal and a second straight line that is orthogonal to the first straight line, the discharge terminal is disposed on an opposite side of the second straight line to the voltage detection terminal.

2. The bipolar battery as defined in claim 1, wherein, assuming two straight lines intersecting at the centroid and causing a planar form of the collector into four regions, the voltage detection terminal is disposed in one of two non-adjacent regions, and the discharge terminal is disposed in another thereof.

3. The bipolar battery as defined in claim 2, wherein the two non-adjacent regions are regions in which an intersection angle of the two straight lines is an acute angle.

4. The bipolar battery as defined in claim 2, wherein the planar form of the collector is rectangular, and the two straight lines intersecting at the centroid are diagonal lines of a rectangle.

5. The bipolar battery as defined in claim 1, wherein the voltage detection terminal and the discharge terminal are disposed at an angular interval between 150 and 210 degrees in an identical collector.

6. The bipolar battery as defined in claim 1, wherein the collector comprises another voltage detection terminal that is connected to the peripheral edge portion of the collector in a vicinity of the discharge terminal.

7. The bipolar battery as defined in claim 1, wherein the collector comprises a pair of discharge terminals, and the voltage detection terminal is disposed on one side of the second straight line whereas one of the pair of discharge terminals is disposed on an opposite side of the second straight line with respect to the voltage detection terminal.

8. The bipolar battery as defined in claim 7, further comprising a pair of discharge circuits, each discharge circuit connected to one of the pair of discharge terminals.

\* \* \* \* \*